(12) United States Patent
Takechi et al.

(10) Patent No.: US 10,942,366 B2
(45) Date of Patent: Mar. 9, 2021

(54) THREE-DIMENSIONAL IMAGE DISPLAY DEVICE

(71) Applicant: Gatebox Inc., Tokyo (JP)

(72) Inventors: Minori Takechi, Tokyo (JP); Naohiro Yasukawa, Tokyo (JP); Wataru Takehi, Tokyo (JP); Takumi Gima, Tokyo (JP)

(73) Assignee: Gatebox Inc., Tokyo (JP)

( * ) Notice: Subject to any disclaimer, the term of this patent is extended or adjusted under 35 U.S.C. 154(b) by 162 days.

(21) Appl. No.: 16/247,707

(22) Filed: Jan. 15, 2019

(65) Prior Publication Data
US 2019/0391405 A1 Dec. 26, 2019

Related U.S. Application Data

(63) Continuation of application No. PCT/JP2017/025807, filed on Jul. 14, 2017.

(30) Foreign Application Priority Data

Jul. 15, 2016 (JP) .............................. JP2016-140709

(51) Int. Cl.
| | | |
|---|---|---|
| G02B 21/14 | (2006.01) | |
| G03B 21/28 | (2006.01) | |
| G02B 30/40 | (2020.01) | |
| G01S 7/52 | (2006.01) | |
| G02B 30/00 | (2020.01) | |

(52) U.S. Cl.
CPC .......... *G02B 30/40* (2020.01); *G01S 7/52068* (2013.01); *G02B 30/00* (2020.01); *G03B 21/28* (2013.01)

(58) Field of Classification Search
CPC ........ G02B 30/00; G02B 30/35; G02B 30/40; G03B 17/54; G03B 21/10; G03B 21/28; G03B 21/62; G01S 7/52068
USPC .............. 353/478, 479, 466, 471, 477, 7, 10
See application file for complete search history.

(56) References Cited

U.S. PATENT DOCUMENTS 4,319,805 A * 3/1982 Nicolas ................... G09F 19/18
359/446
4,943,851 A * 7/1990 Lang .................... G02B 27/642
348/37

(Continued)

FOREIGN PATENT DOCUMENTS

| CN | 102274633 A | 12/2011 |
|---|---|---|
| JP | 09-166762 A | 6/1997 |

(Continued)

OTHER PUBLICATIONS

First Office Action dated Jul. 29, 2020, of counterpart Chinese Application No. 201780054973.5, along with an English translation.

(Continued)

*Primary Examiner* — William C. Dowling
(74) *Attorney, Agent, or Firm* — DLA Piper LLP (US)

(57) ABSTRACT

A three-dimensional image display device includes a case partially or entirely formed of a light transmission member; a substantially flat member having light transmission characteristics erected inside the case; and an image output unit that outputs a predetermined image so that the image can be displayed on the flat member.

12 Claims, 19 Drawing Sheets

(56) References Cited

U.S. PATENT DOCUMENTS

| | | | |
|---|---|---|---|
| 6,183,088 B1* | 2/2001 | LoRe | H04N 13/398 353/7 |
| 6,969,174 B1* | 11/2005 | Radulescu | G02B 30/54 353/7 |
| 7,692,605 B2* | 4/2010 | Tsao | G02B 30/54 345/6 |
| 2012/0075285 A1 | 3/2012 | Oyagi et al. | |
| 2016/0097971 A1 | 4/2016 | Horikoshi et al. | |
| 2016/0119616 A1* | 4/2016 | De Collibus | G03B 21/28 353/10 |
| 2019/0138266 A1* | 5/2019 | Takechi | G06F 16/5866 |
| 2019/0391405 A1 | 12/2019 | Takechi et al. | |

FOREIGN PATENT DOCUMENTS

| | | |
|---|---|---|
| JP | H10-20824 A | 1/1998 |
| JP | 2001-197524 A | 7/2001 |
| JP | 2003-255876 A | 9/2003 |
| JP | 2007-007172 A | 1/2007 |
| JP | 2012-094101 A | 5/2012 |
| JP | 2015-7734 A | 1/2015 |
| JP | 2015-031808 A | 2/2015 |
| JP | 2016-001212 A | 1/2016 |
| JP | 2017-28692 A | 2/2017 |

OTHER PUBLICATIONS

Notice of Reasons for Refusal dated Aug. 11, 2020, of counterpart Japanese Application No. 2018-060903, along with an English translation.

Notice of Reasons for Refusal dated Oct. 3, 2017, of counterpart Japanese Application No. 2016-140709, along with an English translation.

* cited by examiner

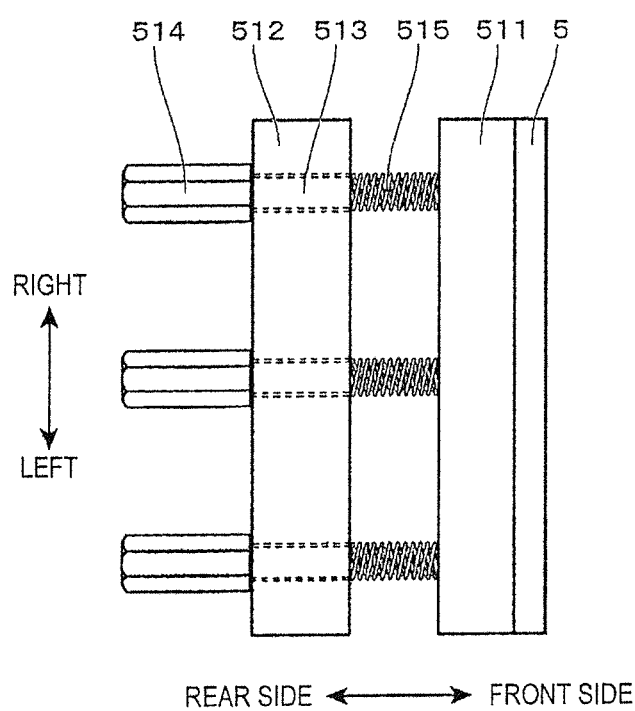

REAR SIDE ←→ FRONT SIDE

REAR SIDE ←——→ FRONT SIDE

REAR SIDE ←——→ FRONT SIDE

THREE-DIMENSIONAL IMAGE DISPLAY DEVICE

TECHNICAL FIELD

This disclosure relates to a three-dimensional image display device capable of three-dimensionally displaying an image of a character, a real person or the like appearing in a cartoon or animation, and more particularly to a three-dimensional image display device capable of displaying an image of a character or the like more three-dimensionally by projecting the image onto a transparent film or the like provided inside a transparent case.

BACKGROUND

A display device capable of three-dimensionally displaying a desired display target is known.

For example, Japanese Unexamined Patent Application Publication No. 2001-197524 describes a three-dimensional image display device that three-dimensionally displays a display target by providing an opaque screen in a transparent wind shield and rotating the screen at a high speed while displaying a two-dimensional image on the screen.

Further, Japanese Unexamined Patent Application Publication No. 2015-31808 describes an image display device capable of causing a display target to be seen three-dimensionally on a background by providing a transparent plate that is inclined so that a lower end portion thereof is located in front of an upper end portion in an opaque box body and causing a three-dimensional image of a background that is transmitted through the transparent plate and a reflection image of the display target reflected by the transparent plate to be visually recognized in a superimposed manner.

However, the three-dimensional image display device disclosed in JP '524 has a problem in that it is difficult to recognize a real object because a display target is three-dimensionally displayed using an afterimage effect. Further, since the screen is not transparent, a background around the display target that would be visible when the screen were transparent cannot be visually recognized through the screen.

In a relationship between the display target and the background, a depth feeling, motion parallax or the like does not occur and there is a problem in that it is difficult to obtain a three-dimensional effect.

Further, the image display device of JP '808 forms a three-dimensional object which is a background different from a background of a real space in the box and expresses a three-dimensional feeling of the display target in a relationship with a background image. Therefore, it lacks an integral three-dimensional feeling as if the display target were in the same space as a user.

It could therefore be helpful to provide an image display device capable of displaying a display target such as a character in a three-dimensional partitioned space using a predetermined method to cause the display target to be recognized like a real object in the same space more three-dimensionally.

SUMMARY

We thus provide a three-dimensional image display device including a case partially or entirely formed of a light transmission member; a flat member having light transmission characteristics erected inside the case; and an image output unit that outputs a predetermined image so that the image can be displayed on the flat member.

According to the three-dimensional image display device, it is possible to display a display target like a real object in the same space more three-dimensionally.

BRIEF DESCRIPTION OF THE DRAWINGS

FIG. 4A is a plan view of a mirror attachment portion.

FIGS. 5A to 5C are diagrams schematically illustrating a device mounted in the three-dimensional image display device according to the first example, wherein FIG. 5A is a diagram schematically illustrating a device installed in an upper accommodation portion, FIG. 5B is a diagram schematically illustrating a device installed in a pillar portion, and FIG. 5C is a diagram schematically illustrating a device installed in a lower accommodation portion.

EXPLANATION OF REFERENCES

1 Three-dimensional image display device
2 Case
21 Upper accommodation portion
22 Lower accommodation portion
221 Pedestal
23 Post
3 Transmission film (flat member)

4 Projector (image output unit)
5 Reflection mirror (reflection unit)
51 Mirror attachment portion (adjustment unit)
6 Pillar portion
71 Control unit (output control unit)
72 Input unit (input unit)
73 Output unit (output unit)
706 Effect LED (light emitting unit)

DETAILED DESCRIPTION

Examples of a three-dimensional image display device will be described below with reference to the drawings.

First Example

Figure 1:
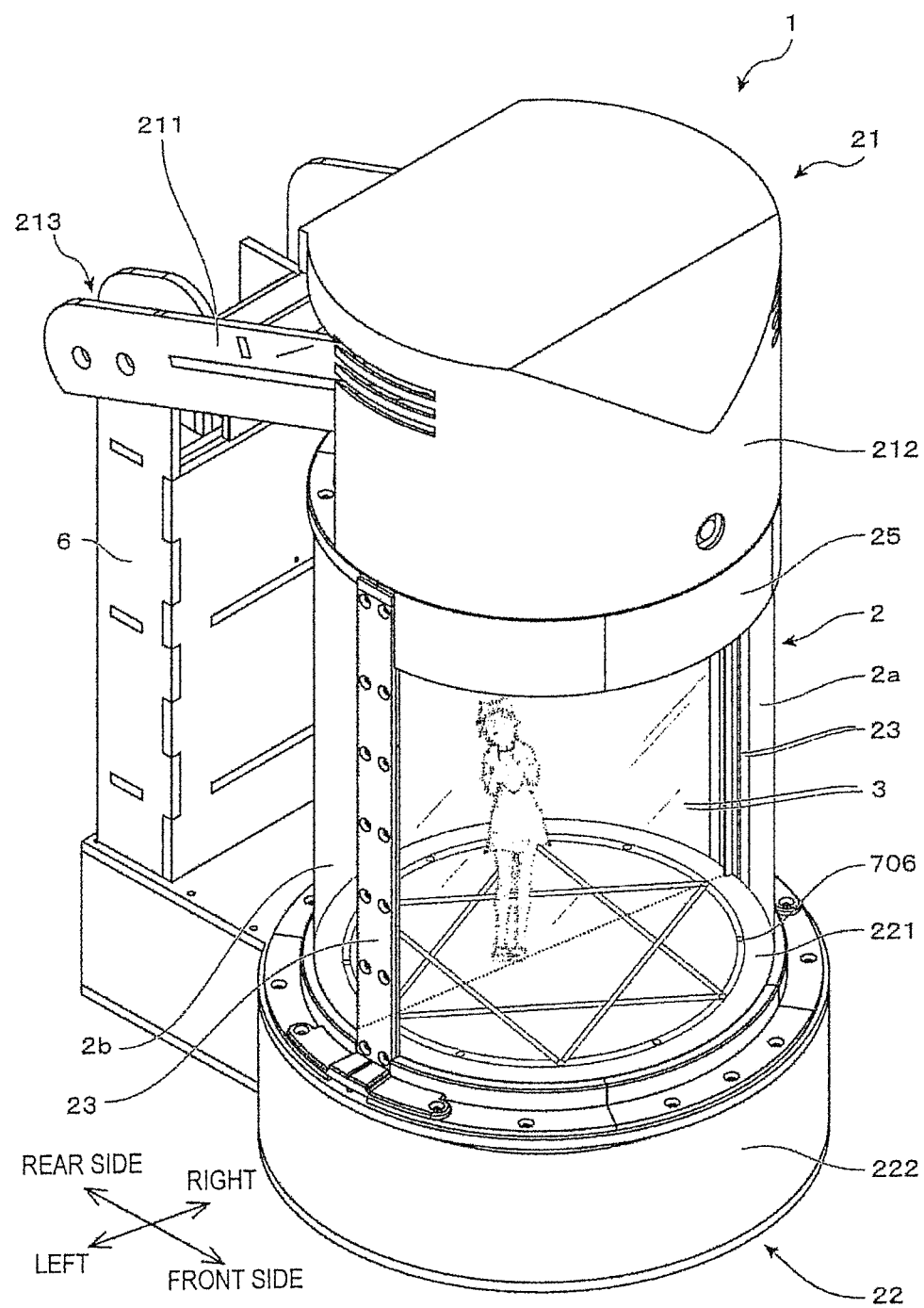
FIG. 1 is a perspective view of a three-dimensional image display device according to a first example as viewed from above.

FIG. 1 is a perspective view of a three-dimensional image display device according to a first example when viewed from above.

Figure 2:
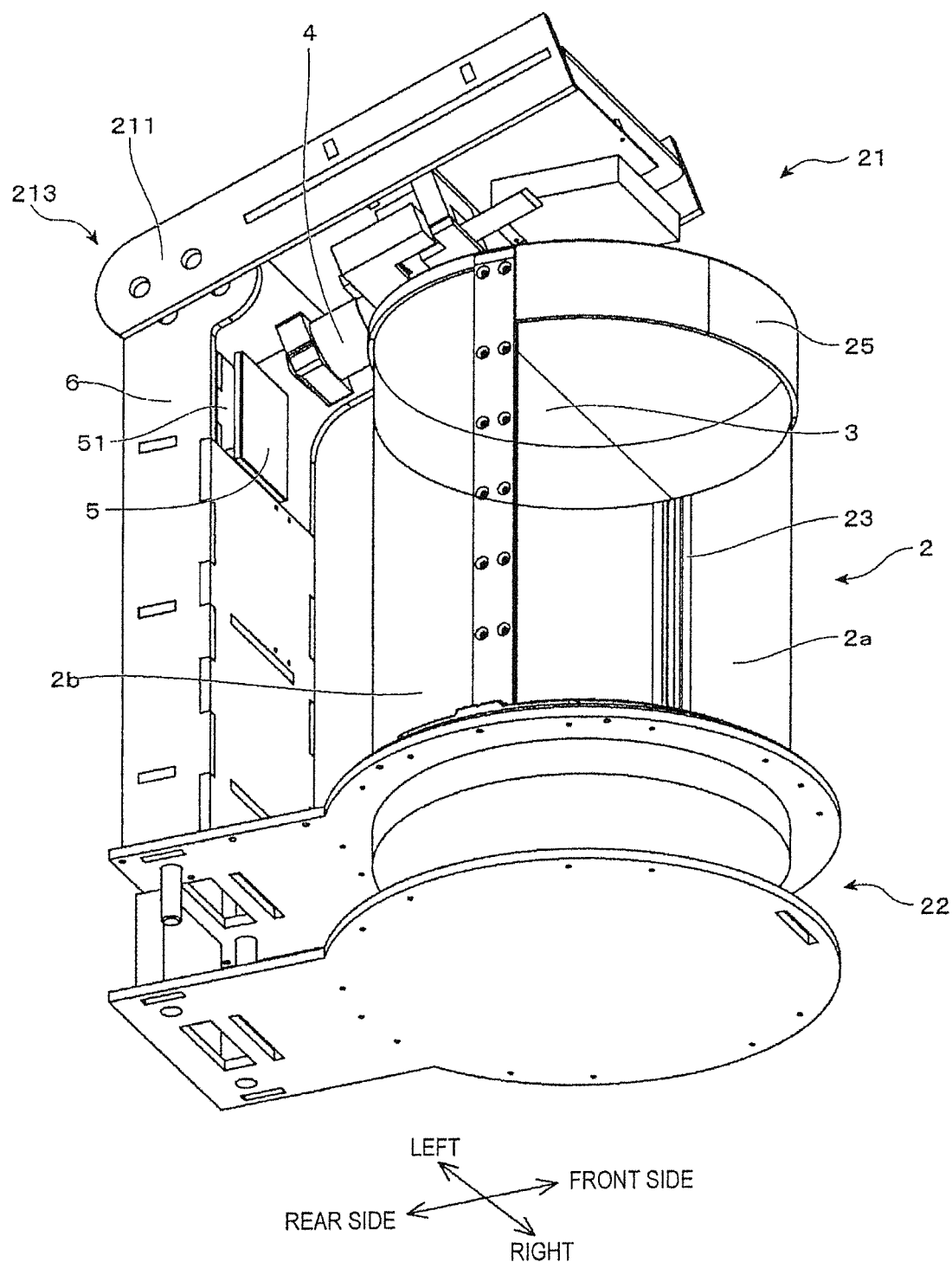
FIG. 2 is a perspective view of the three-dimensional image display device according to the first example as viewed from below.

FIG. 2 is a perspective view of the three-dimensional image display device according to the first example when viewed from below.

As illustrated in FIGS. 1 and 2, the three-dimensional image display device 1 according to the first example mainly includes a hollow transparent cylindrical case 2, a transmission film (a flat member) 3 erected substantially vertically inside the case 2, and a projector (an image output unit) 4 that outputs an image of a character or a person (hereinafter referred to as a character or the like).

The three-dimensional image display device 1 of the example has a configuration in which a component or a device such as a reflection mirror 5 is added to such a basic configuration.

In the three-dimensional image display device 1 having such a configuration, the image output from the projector 4 is projected onto the transmission film 3 through reflection of the reflection mirror 5, and a user can see the image projected onto the transmission film 3 in this way through the transparent case 2.

The case 2 is a housing partially or entirely formed of a light transmission member, and is formed of, for example, an acrylic plate.

In the case 2 of the example, an entirely transparent integral cylinder is formed by integrating two transparent semi-cylindrical case members 2a and 2b into two posts 23.

However, a cylindrical body formed in advance can also be used for the case 2, and a cylindrical body formed by bending a rectangular plate member or film material having elasticity or flexibility into a semicircular pillar shape and incorporating the material into the posts 23 can also be used as the case 2.

Using the cylindrical case 2 in this manner, it is possible to appropriately visually recognize the image projected onto the transmission film 3 from any angle on the left and right sides.

The post 23 may be formed of a transparent member and, in this example, substantially the entire case 2 can be made transparent. However, the post 23 may be opaque or translucent.

An opaque shielding portion 25 having a strip form curved along a surface of the case 2 is provided in an upper portion of the front side of the case 2.

Accordingly, when the case 2 is viewed from the front side, the reflection mirror 5 is behind the shielding portion 25. Therefore, the reflection mirror 5 can be hidden and invisible.

Further, although not illustrated, a circular portion corresponding to an upper bottom surface of the case 2 is subjected to light shielding treatment such as coating of light shielding paint.

Thus, it is possible to prevent indoor lighting or the like from entering the transmission film 3, and make it easy for the image displayed on the transmission film 3 to be viewed.

Further, an opening portion is provided in the upper portion on the rear side of the case 2 (an upper portion of the case member 2b) so that the image light from the reflection mirror 5 can directly reach the transmission film 3 without passing through the case member 2b.

The case 2 is not limited to the transparent member and a translucent such as milky white member may be used.

The transmission film 3 is provided inside such a case 2, and an upper accommodation portion 21, a lower accommodation portion 22, and a pillar portion 6 (to be described below) are provided on the upper side, the lower side, and the rear side of the case 2.

The transmission film 3 is an example of a "flat member having light transmission characteristics," and functions as a transparent screen onto which a predetermined image is projected.

The transmission film 3 of the example has a rectangular shape and is erected to be substantially vertical near a center of the inside of the case 2.

Specifically, the transmission film 3 is supported by two posts 23 erected on both end portions of a pedestal 221. Accordingly, the transmission film 3 is vertically erected at the center of the pedestal 221 with a surface of the transmission film 3 directed to a front side (rear side).

A transparent plate material, a translucent plate material, a film material or the like can be used in place of the transmission film 3.

The lower accommodation portion 22 is a box body formed of plastic or the like and includes a space in which a control board 701 that performs various control operations including output control of the projector 4, and other devices (see FIG. 5C) are attached.

A detachable lower cover 222 is provided in the lower accommodation portion 22. When the lower cover 222 is attached, the inside of the lower accommodation portion 22 can be concealed, and when the lower cover 222 is detached, maintenance of an internal device or the like is enabled.

The posts 23 are erected on right and left end portions at erecting positions of the transmission film 3 on the pedestal 221 on an upper surface of the lower accommodation portion 22.

The transmission film 3 and the case members 2a and 2b are integrally erected on the pedestal 221 by being supported by the posts 23.

Accordingly, the cylindrical case 2 is erected on the pedestal 221, and the transmission film 3 is provided so that a lower portion (a lower end) of the transmission film 3 is along an upper surface (front surface) of the pedestal 221 while a side portion of the transmission film 3 is in internal contact with the case 2.

The pedestal 221 also functions as a table on which a character or the like to be displayed inside the case 2 is virtually placed. That is, the pedestal 221 can be made to look like a base substrate of a display case that houses a doll or a model in a displayable manner.

Figure 7:
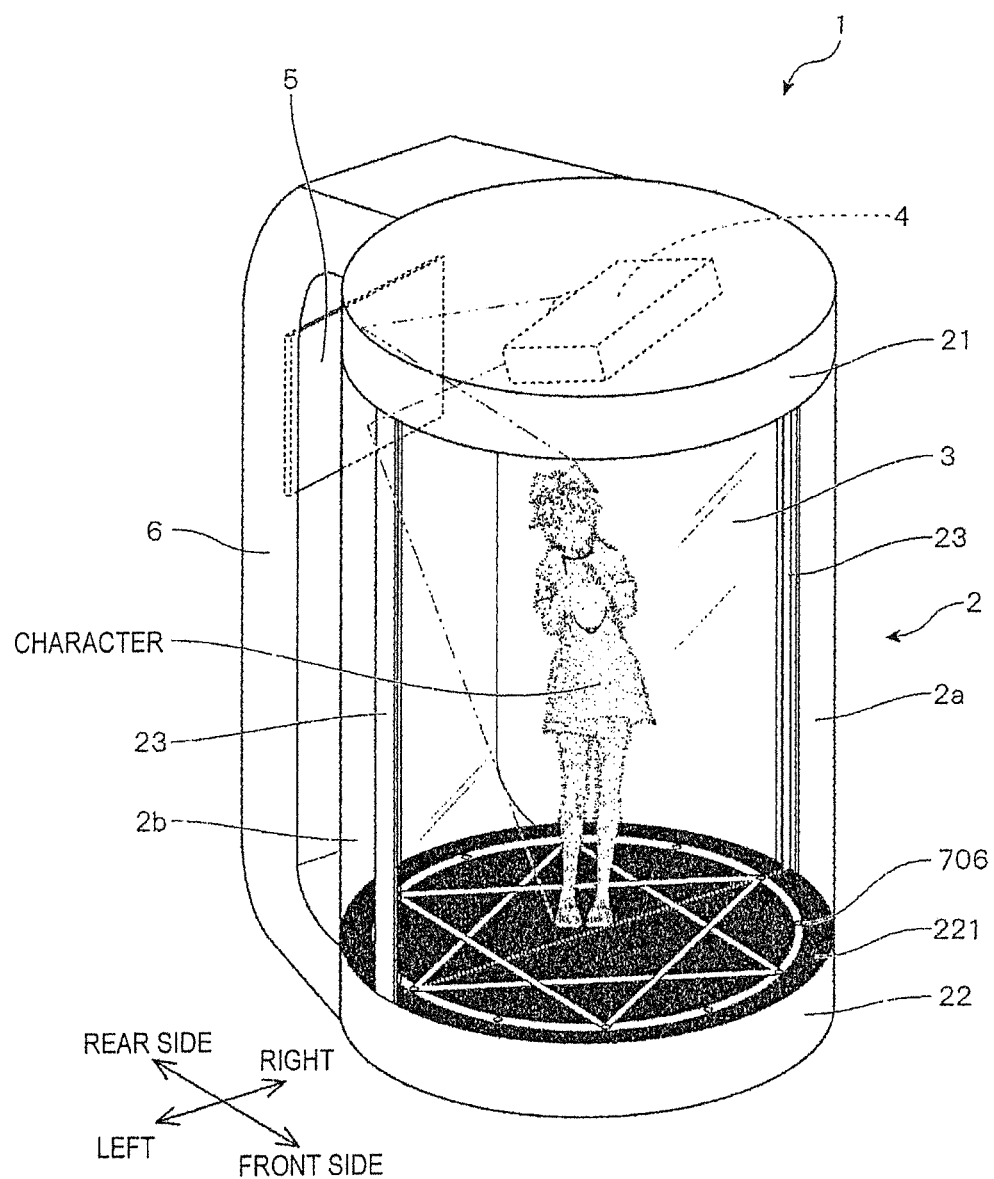
FIG. 7 is a perspective view of a three-dimensional image display device according to a second example when viewed from above.

In the example, an angle or a direction of the reflection mirror 5 is adjusted by the mirror attachment portion 51 to be described below so that a foot of the character or the like is matched with the lower end of the transmission film 3 and the character or the like is displayed (FIGS. 1 and 7).

Thus, it is possible to cause the character or the like to look as if the character or the like were actually erected on the pedestal 221.

Further, the pedestal 221 has predetermined visibility. Specifically, presence of the pedestal 221 is made conspicuous by patterning or coloring the surface of the pedestal 221 or characterizing a shape of the pedestal 221.

For example, in the pedestal 221 of the example, grooves are formed along a pattern of a so-called magic square on a surface of an acrylic plate by laser processing or the like.

Further, in the pedestal 221, a plurality of effect LEDs 706 (light emitting unit) are disposed in a distributive manner in the lower portion of the acrylic plate so that the light from the effect LEDs 706 can reach the entire surface of the pedestal 221.

Thus, since each region straddling the transmission film 3 is strongly recognized on the surface of the pedestal 221, it is possible to emphasize the presence of the pedestals 221 before and after the character or the like is projected onto the transmission film 3.

Thus, it is possible for the character or the like to look as if the character or the like firmly standed on the pedestal 221.

The upper accommodation portion 21 includes a space in which a device (see FIG. 5A) such as the projector 4 that performs image output is attached.

Specifically, an upper device attachment portion 211 having a ladder shape connected to an upper portion of the pillar portion 6 is provided in the upper accommodation portion 21, and the projector 4 is attached to a lower surface of the upper device attachment portion 211.

Figure 3:
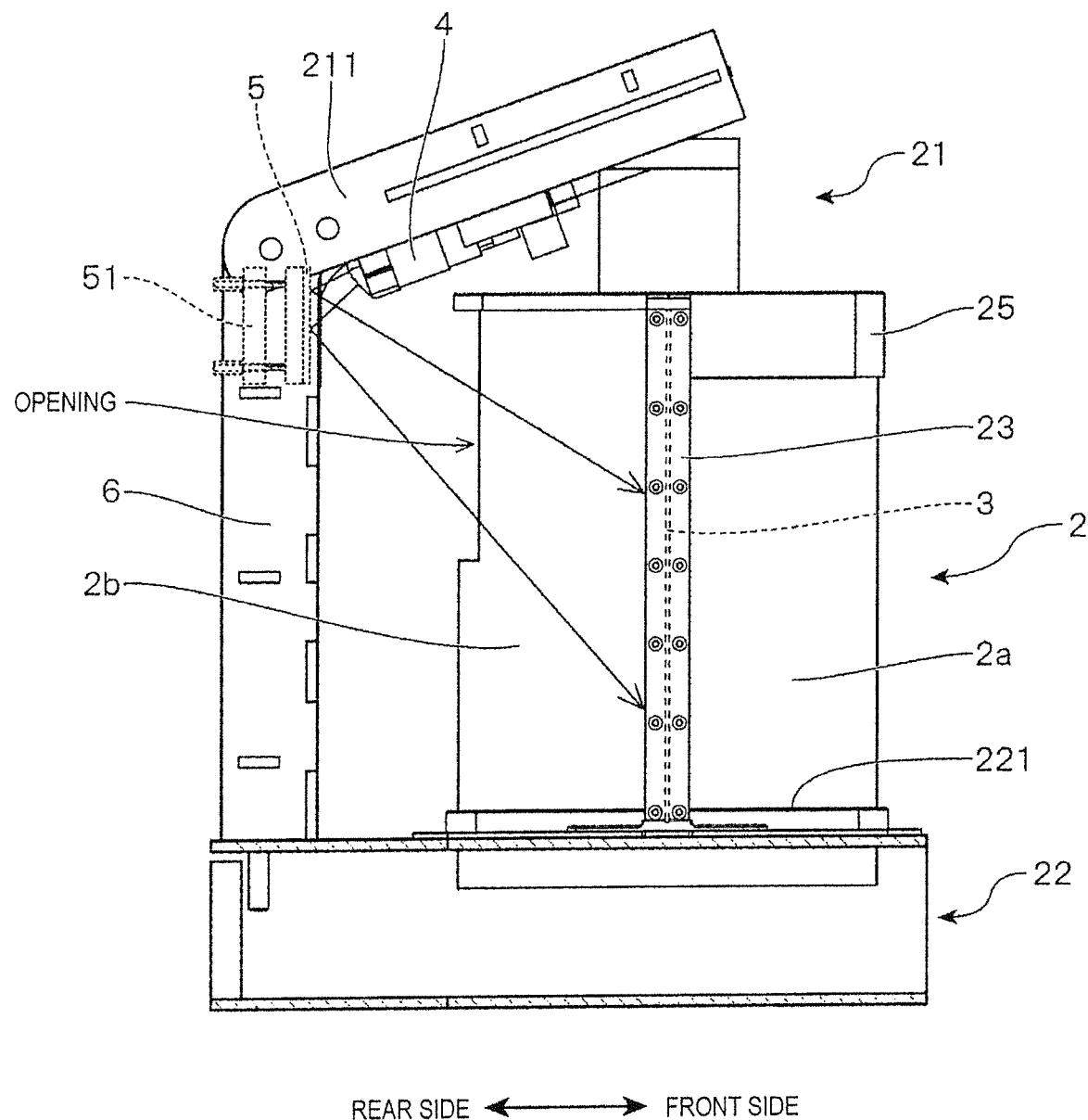
FIG. 3 is a left side view of the three-dimensional image display device according to the first example.

As illustrated in FIGS. 2 and 3, the upper device attachment portion 211 is fixed in a state in which the upper device attachment portion 211 is inclined from a connection portion 213 with the pillar portion 6 to an upward side on the front side, and accordingly, the projector 4 attached to the upper device attachment portion 211 is fixed in a state in which the projector 4 is inclined obliquely.

Thus, the projector 4 is obliquely attached so that an output direction of the image is directed to the reflection mirror 5 located on the lower side of the rear side of the projector 4.

The upper device attachment portion 211 can be pivotally supported by a shaft member such as a bolt in connection with the pillar portion 6, rotated to an arbitrary position around a shaft, and fixed with a fixing member such as a nut.

Thus, an inclination of the projector 4 can be easily changed, and an output of the image can be adjusted in a vertical direction through this change.

A detachable upper cover 212 is provided in the upper accommodation portion 21 such that the upper device attachment portion 211 or a device such as the projector 4 can be concealed through attachment of the upper cover 212, and maintenance and the like of internal devices can be performed by detaching the upper cover 212.

The projector 4 is an image output unit that outputs an image of a character or the like. This type of projector 4 normally displays an image by directly projecting an image on a so-called screen, whereas in the example, an image is indirectly projected onto a screen (the transmission film 3) via the reflection mirror 5.

Specifically, the projector 4 in the example is attached in a state in which the projector 4 is inclined in the upper accommodation portion 21 so that the output image is directed to the reflection mirror 5 in an upper portion of the pillar portion 6 erected to be spaced on the rear side of the case 2.

A specification of the projector includes a focal length (hereinafter referred to as an allowable projection distance) and a projection ratio (hereinafter referred to as allowable projection angle).

The allowable projection distance is a necessary projection distance (a distance of an optical path from the projector to the screen) corresponding to a size of the image. When an actual projection distance is less than the allowable projection distance, focusing is not achieved and the image cannot be clearly projected.

The allowable projection angle is an allowable value of the angle between the optical path of the image projected onto the screen and the screen. When an actual projection angle is less than the allowable projection angle, distortion of the image becomes large, and there is a difference in the amount of light between both end portions of the image, thereby causing degradation of image quality such as image blurring.

In consideration of these points, in the projector 4 of the example, the projector 4 and the screen (that is, the transmission film 3) can be integrated in a compact manner using a specification in which the allowable projection distance is relatively short and the allowable projection angle is small and using the reflection mirror 5.

It is possible to use the projector 4 having a specification in which the allowable projection distance is shorter and the allowable projection angle is smaller, as in the other examples described below.

Thus, since the projection distance is shorter and the projection angle is smaller, a device body can be more compact.

Further, as in other examples to be described below, it is also possible to adopt a configuration in which the image output from the projector 4 is directly projected onto a screen without passing through the reflection mirror 5.

With such a configuration, the entire device can be made compact.

The pillar portion 6 is a pillar member erected on a backmost portion of the lower accommodation portion 22 and is erected to be spaced from the case 2 on the rear side of the case 2.

Thus, by providing the pillar portion 6 on the rear side of the case 2, it is possible to prevent an indoor lighting or the like from entering the transmission film 3 and to make it easy to see the image displayed on the transmission film 3.

The reflection mirror 5 or various sensors are attached to pillar portion 6 (see FIGS. 2, 3, 5(*ii*) or the like).

The reflection mirror 5 is provided so that a mirror surface is substantially vertical (that is, substantially parallel to the surface of the transmission film 3) in the upper portion of the pillar portion 6.

Accordingly, image light having a predetermined incidence angle output in a diagonally downward direction on the rear side from the projector 4 is reflected at the same angle (a reflection angle) as the incidence angle, and the image is projected onto the transmission film 3 by the reflected light.

Thus, since it is possible to suppress a difference in projection distance between an upper portion and a lower portion of the image in the transmission film 3, it is possible to suppress blurring of the image projected onto the transmission film 3.

Figure 4B:
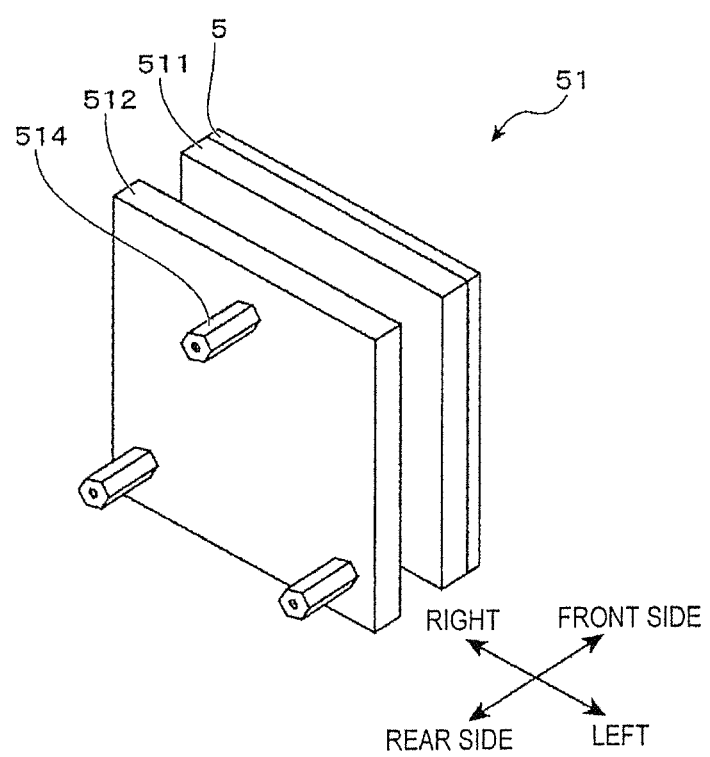
FIG. 4B is a perspective view of the mirror attachment portion when viewed from an upper rear side.

Specifically, the reflection mirror 5 is attached in a state in which the reflection mirror 5 has been adjusted at an appropriate angle or direction by the mirror attachment portion 51 (an adjustment unit) illustrated in FIGS. 4A and 4B.

FIG. 4A is a plan view of the mirror attachment portion, and FIG. 4B is a perspective view of the mirror attachment portion when viewed from an upper rear side.

As illustrated in FIGS. 4A and 4B, the mirror attachment portion 51 includes a plate 511 that holds the reflection mirror 5, three total screws 513 fixedly attached to a rear side of the plate 511, a base 512 facing the plate 511 and fixed to the pillar portion 6 in a state in which the total screws 513 are inserted into through holes, nuts 514 inserted into the through holes of the base 512 and screwed onto the total screws 513 protruding to the rear side, and a spring 515 that applies a biasing force so that the plate 511 and the base 512 move in opposite directions.

According to the mirror attachment portion 51 having such a configuration, when an optional nut 514 is turned in a clockwise direction, screwing with respect to the total screw 513 progresses. Then, since the base 512 is fixed to the pillar portion 6, a portion of the plate 511 to which the total screw 513 is fixed approaches the base 512.

On the other hand, when the optional nut 514 is turned in a counterclockwise direction to loosen the screwing with respect to the total screw 513, the portion of the plate 511 to which the total screw 513 is fixed is separated from the base 512.

Therefore, it is possible to adjust the angle or the direction of the reflection mirror 5 attached to the mirror attachment portion 51 using such a method.

Therefore, according to the mirror attachment portion 51, a position of the image projected onto the transmission film 3 by the reflection of the reflection mirror 5 can be adjusted to a desired position.

As illustrated in FIG. 3, the image light output from the projector 4 is reflected by the reflection mirror 5, the reflected image light is traveled in an obliquely downward direction to the front side, is passed through an opening portion of the case member 2b, and projected onto the transmission film 3 provided inside the case 2 from the rear side. In this state, when the image of the character or the like projected onto the transmission film 3 through the case 2 is viewed, the character or the like can be visually recognized as an actual object in the same space more three-dimensionally.

A reason for achievement of such a visual recognition effect will be described below.

As described above, in the three-dimensional image display device 1 of the example, the transparent film (transmission film 3) is provided inside the transparent case 2, and an image is projected onto this transparent film.

In such a three-dimensional image display device 1, the user views the character or the like displayed on the transparent film through the transparent case 2.

In this example, the user recognizes a 3D environment, that is, vertical (height), horizontal, and depth in a space such as the inside of the case 2 limited by being partitioned in the case 2. Therefore, particularly, a visual effect (a 3D environmental effect) in which the character or the like itself is seen three-dimensionally (stereoscopically) by recognizing the depth generated from a relationship between the character or the like displayed in the space and the case 2 is achieved.

That is, the character or the like and a partition on the rear side thereof are visually recognized together in a closed space by visually recognizing the transparent case 2 behind the character or the like and, as a result, the character or the like is three-dimensionally seen on the basis of the sense of depth of the character or the like and the transparent case 2 in the same space.

On the other hand, when the case 2 is omitted and the image of the character or the like projected onto the transparent film is seen in the open space with nothing around, the surrounding space is strongly recognized vertically and horizontally, whereas the recognition of the depth is weak.

Then, even when an image of the character or the like projected onto the transparent film is viewed in such an open environment, it is difficult to feel the sense of depth just by increasing the presence of the film. Accordingly, a three-dimensional visual effect as described above cannot be achieved.

Further, when the transparent film is viewed through the transparent case 2, the transparent film is not conspicuous.

This is because the transmission film 3 is in internal contact with the case 2 so that left and right end portions of the transmission film 3 become invisible.

Further, it becomes difficult to recognize substance on the rear side when the rear side is viewed through a front substance including transparent substance.

When this is applied to the three-dimensional image display device 1 of the example, it becomes difficult to recognize the transmission film 3 behind the case 2 (the case member 2a), for example, when the case 2 is viewed from the front side.

Then, the presence of the planar transmission film 3 is not recognized so that a character or the like projected onto the transmission film 3 appears like a floating non-planar three-dimensional object.

For such a reason, the image of the character or the like can look more three-dimensionally when the case 2 is present as compared when the case 2 is not present.

Further, in the three-dimensional image display device 1 of the example, the pedestal 221 is provided on the lower side (at a lower end) of the transmission film 3 and a foot of the character or the like matches the lower end of the transmission film 3 and is displayed.

Thus, the character or the like looks as if the character or the like is erected on the pedestal 221, and a user is deluded as if the character or the like is a three-dimensional object with mass.

In particular, the pedestal 221 has, for example, a pattern so that the surface is easy to visually recognize, and the effect LEDs 706 are disposed in both a front side region and a rear side region straddling the transmission film 3 to emit light.

Accordingly, it is possible to clearly recognize the presence of the pedestal 221 before or after the character or the like, and cause the character or the like to look as if the character or the like is erected in a state in which the character or the like is firmly standing on the pedestal 221.

Therefore, according to such a relationship with the pedestal 221, it is possible to cause the character or the like projected onto the transmission film 3 in the transparent case 2 to look like a three-dimensional object that is a real body.

In addition, the reflected light from the reflection mirror 5 provided in the upper portion on the rear side is projected onto the transmission film 3, and a part of the image light is transmitted through the transmission film 3 and projected onto the pedestal 221 as a shadow of the light.

An effect that a display target is three-dimensionally visually recognized by such a shadow being visually recognized is achieved.

Next, a device mounted in the three-dimensional image display device of the example will be described with reference to FIGS. 5A to 5C.

Figure 5A:
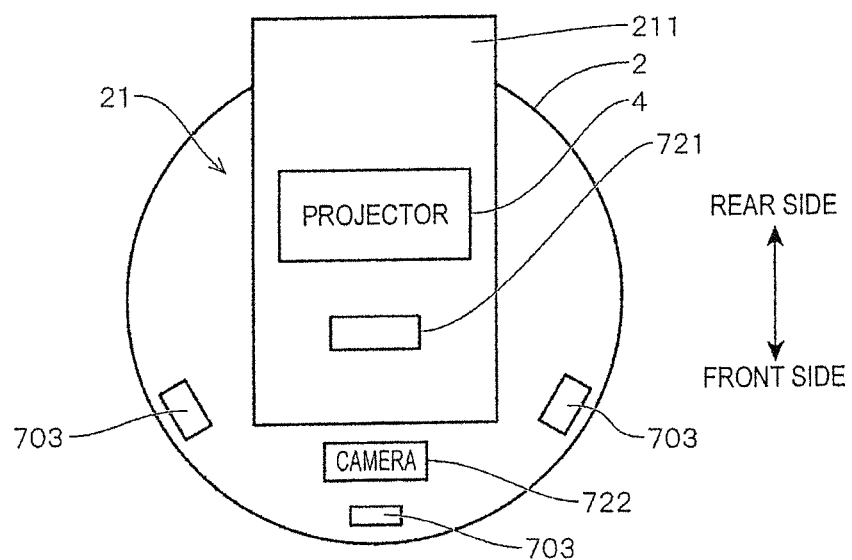
Figure 5B:
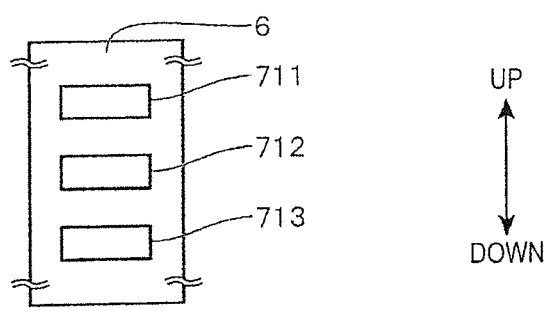
Figure 5C:
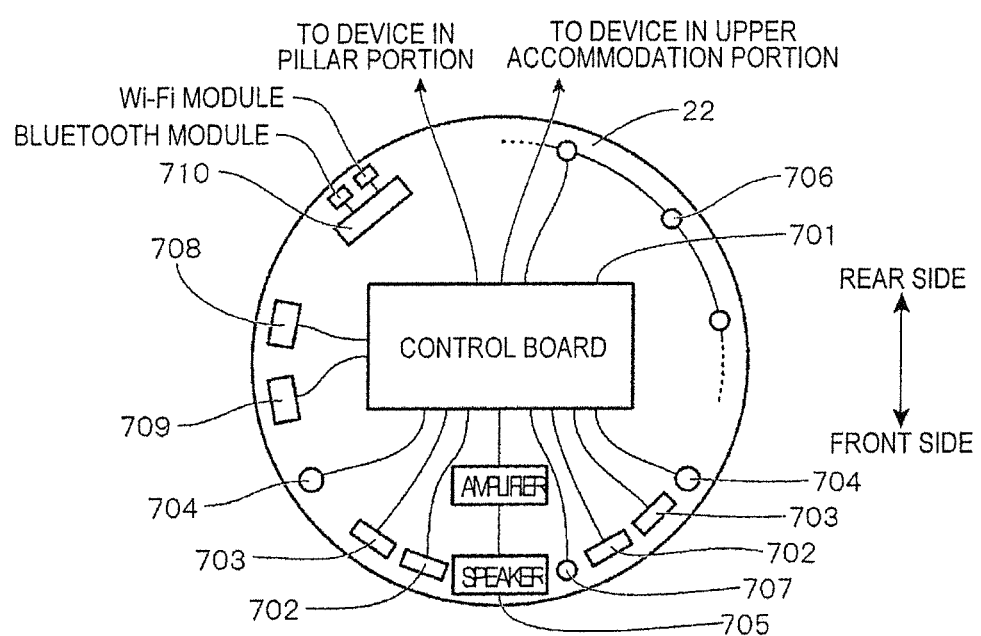

FIG. 5A is a device installed in the upper accommodation portion, FIG. 5B is a device installed in the pillar portion, and FIG. 5C is a schematic diagram of a device installed in the lower accommodation portion.

Devices Installed in Lower Accommodation Portion

As illustrated in FIG. 5C, the control board 701, human sensors 702, infrared LEDs 703, microphones 704, a speaker 705, the effect LED 706, an infrared light reception unit 707, a status LED 708, an activation button 709, a USB hub 710, a Wi-Fi (registered trademark) module, a Bluetooth (registered trademark) module and the like are installed in the lower accommodation portion 22.

The control board 701 includes one or a plurality of control chips in which a CPU, a ROM, a RAM, an HDMI (registered trademark) port, a LAN port, a USB port, various input/output ports and the like have been mounted, and causes a predetermined device to execute an operation of outputting various type of information including an image and a voice on the basis of information input from various sensors or the like.

The human sensors 702 are sensors that detect the amount of change in infrared rays to detect a location of a person and are provided on the left and right sides of the front side.

The infrared LEDs 703 are provided on the left and right sides, respectively, and function as so-called infrared remote controllers. Specifically, the infrared LEDs 703 output infrared rays to surroundings such that an external device such as a television or a vacuum cleaner can be remotely operated.

The microphones 704 are provided on the left and right side, and inputs sound emitted from the user.

The speaker 705 is provided on the front side and outputs sound information such as voice and music via an amplifier.

The effect LED 706 is a light emitting unit in the pedestal 221.

The infrared light reception unit 707 is provided on the front side and receives infrared information on a remote control operation that is used for remote control from a remote control of a television or a lighting fixture.

The status LED 708 is an informing unit that indicates a state of the three-dimensional image display device 1 (for example, power on, sleeping, error occurrence, or communicating) and informs various statuses to be distinguishable from each other using a specific blink pattern, light emitting color or the like.

The activation button 709 is an operation unit for turning ON/OFF a power of the main body of the three-dimensional image display device 1.

The USB hub 710 is a hub for connecting a plurality of USB devices.

The Wi-Fi (registered trademark) module is a wireless LAN module connected to the USB hub, and can provide, as an access point, an Internet environment to a wireless LAN child device, and connects, as a wireless LAN child device, to the Internet via another access point.

The Bluetooth (registered trademark) module is a wireless communication interface that enables wireless communication with peripheral devices such as a keyboard and a mouse corresponding to a predetermined standard.

Devices Installed in Pillar Portion

As illustrated in FIG. 5B, a temperature and humidity sensor 711, a vibration sensor 712, and a noise sensor 713 are provided in the pillar portion 6, in addition to the reflection mirror 5 described above.

The temperature and humidity sensor 711 measures a temperature and humidity of the inside and inputs measurement values.

The vibration sensor 712 is a sensor that detects vibration, and corresponds to, for example, a piezo vibration sensor. The vibration detected by the vibration sensor 712 includes a relatively small vibration that can be distinguished between a footstep and opening or closing of doors, in addition to a large tremor such as an earthquake.

The noise sensor 713 is a sensor that detects environmental sound indoors. Examples of an environmental sound detected by the noise sensor 713 include a living sound (including a sound of a television) of a user, an environmental sound in the vicinity, and a noise that are distinguished on the basis of a predetermined reference sound volume.

Devices Installed in Upper Accommodation Portion

As illustrated in FIG. 5C, the projector 4, the infrared LED 703, an optical sensor (an illuminance sensor) 721, and a camera 722 are provided in the upper accommodation portion 21.

The projector 4 projects an image onto the transmission film 3 via the reflection mirror 5, as described above. The image output from the projector 4 includes, for example, a 2D image or a 3D image of each character or a real person, an object or the like appearing in various cartoons or animations.

The infrared LEDs 703 are provided on the left and right sides and function as infrared remote controllers, similar to those provided in the upper accommodation portion 21.

The optical sensor (an illuminance sensor) 721 is a sensor that measures brightness (illuminance).

The camera 722 is an imaging unit that is provided in front and captures a still image or a moving image.

Next, a function that is realized by each device described above will be described with reference to FIG. 6.

Figure 6:
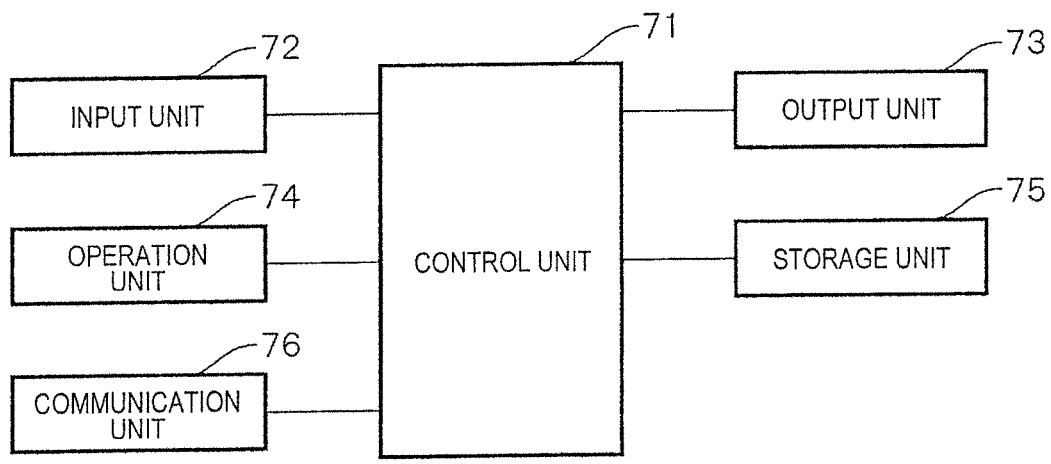
FIG. 6 is a functional block diagram of the three-dimensional image display device according to the first example.

FIG. 6 is a functional block diagram of the three-dimensional image display device according to the example.

As illustrated in FIG. 6, the three-dimensional image display device 1 of the example includes a control unit 71, an input unit 72, an output unit 73, an operation unit 74, a storage unit 75, and a communication unit 76.

The input unit 72 is an input unit that performs input of various types of information detected by various sensors.

Examples of the data input by the input unit 72 include identification information output from the human sensor 702 when the human sensor 702 has detected a person, voice information input via the microphone 704, information on an indoor temperature and humidity detected by the temperature and humidity sensor 711, information for identifying a magnitude or change of the vibration detected by the vibration sensor 712, sound volume information input via the noise sensor 713, illuminance information input via the optical sensor 721, and information on still images and moving images captured by the camera 722.

The output unit 73 is an output unit that performs output of a signal or information on the basis of a predetermined command.

Examples of the signal or the information output by the output unit 73 include an infrared signal that controls an operation of an external device output from the infrared LED 703, sound information output via the speaker 705, light emitted from the effect LED 706, and an image output from the projector 4.

The operation unit 74 is an operation unit for a user, and corresponds to, for example, a keyboard or a mouse (not illustrated).

Examples of an operation is performed by the operation unit 74 include turning ON/OFF of a power supply of the device body using the activation button 709.

The storage unit 75 is, for example, a storage unit configured of a RAM, or a nonvolatile memory such as an EEPROM or a flash memory, which constitutes the control unit 71, and stores programs or data for executing various functions of the three-dimensional image display device 1.

The data stored in the storage unit 75 includes, for example, remote control information on remote control of an external device such as a television or a lighting fixture, calendar information registered at a calendar site, attribute information of a user, attribute information of the device body or each device, information input from a sensor, information on an image or a voice of the character or the like associated with, for example, identification information of a character string of a name of the character or the like, and music information.

The programs stored in the storage unit 75 include, for example, a speech recognition program or an artificial intelligence program, in addition to a program that executes various control operations to be described below.

The communication unit 76 is a communication unit that performs a wire or wireless bidirectional or unidirectional data communication process with an external device. For example, the communication unit 76 can transmit and receive various types of data to and from a device connected to the Internet via a LAN cable connected to a LAN port or a wireless manner based on a Wi-Fi (registered trademark) module.

An example of the data that can be received by the communication unit 76 includes information that can be acquired via the Internet such as weather information that can be received from a weather information site or calendar information registered in a calendar site.

The control unit 71 performs various control operations according to a predetermined program.

For example, the control unit 71 can access the weather information site at the time of activating the body device, acquire weather information on that day, and store the weather information in the storage unit 75.

Further, the control unit 71 can periodically access the calendar site in which a schedule of a user is registered, and store the latest calendar information obtained through the access in the storage unit 75.

Further, remote control information (infrared information) on the external device can be received from a remote controller of an external device such as a television or a lighting by the infrared light reception unit 707 and stored (learned) in the storage unit 75, and infrared information for operating the external device can be transmitted from the infrared LED 703 on the basis of the remote control information.

Further, the control unit 71 operates as an output control unit, and controls output of information including the image that is performed by the image output unit, on the basis of input information.

Specifically, the following control operation is performed.
Operation Regarding Voice When predetermined environmental information including sound information is input, the control unit 71 performs a control operation to output predetermined image information and/or sound information regarding a predetermined character or the like associated with the environmental information.

For example, when the user calls a name of the character or the like toward the microphone 704, it is possible to display an image of the character or the like corresponding to the name.

Specifically, the control unit 71 converts a voice input from the microphone 704 into a character string using a voice recognition program, fetches image data of the character or the like associated with the character string in advance from the storage unit 75, and causes the image data to be output from the projector 4. Accordingly, the image of the character or the like output from the projector 4 is projected onto the transmission film 3 via the reflection mirror 5 (see FIG. 1).

Therefore, the user can call a favorite character or the like whenever the user desires, and can cause the character or the like to be displayed in the transparent case 2 which can show the character or the like more three-dimensionally.

Further, when the user talks to the character or the like, the character or the like can be operated to behave according to the speech of the user.

For example, when a voice "Today's weather?" is input from the microphone 704 according to the speech of the user, the control unit 71 converts the voice to a character string, fetches information on today's weather (for example, "sunny") associated with the character string in advance, from the storage unit 75, and causes predetermined voice to be output from the speaker 705. For example, "Today's weather is sunny." can be output through the voice of the displayed character or the like.

Further, when a voice "See you," "I'm home" and "Good night" is input from the microphone 704 according to the speech of the user, the control unit 71 converts the voice to a character string, fetches voice data "Have a nice day," "Welcome back" and "Good night" associated with the character string in advance, from the storage unit 75, and causes the voice data to be output from the speaker 705. The control unit 71 fetches a gesture image of the character or the like associated with this character string in advance from the storage unit 75 and outputs the gesture image from the projector 4. The image of the character or the like output from the projector 4 is projected onto the transmission film 3 via the reflection mirror 5.

Accordingly, it is possible not only to display the character or the like simply three-dimensionally, but also to have a dialog function.

Therefore, it is possible to give the user a feeling as if the user is living with the character or the like in the same space.

Further, ON/OFF of the lighting can also be controlled according to voice input.

For example, when a voice "Turn off" or "good night" is input from the microphone 704, the control unit 71 fetches, from the storage unit 75, remote control information on OFF of the lighting stored in the storage unit 75 in association with this character string in advance and causes corresponding infrared information to be transmitted from the infrared LED 703.

Accordingly, it is possible to turn off an indoor lighting. Further, similarly, it is possible to turn on the lighting according to "Welcome back" or "Good morning."

Further, a control operation in which such voice input is combined with human detection of the human sensor 702 is also possible.

For example, when a voice of "See you" is input from the microphone 704 by a speech of the user, the control unit 71 transitions to a monitoring mode corresponding to a character string obtained by this voice. The control unit 71 can transition to the monitoring mode in correspondence to "Have a nice day" due to the character or the like.

The monitoring mode is a mode in a state in which the user does not exist indoors.

Therefore, the monitoring mode can be released when a voice of "I'm home" is input through a speech of the user and a character string obtained by this voice is detected. The monitoring mode can also be released in correspondence to "Have a nice day" through the character or the like.

For example, when a person is detected by the human sensor 702 during the monitoring mode, the control unit 71 can determine that this is abnormal and can inform of this. Specifically, the control unit 71 can output a predetermined alarm sound or a warning message from the speaker 705 or transmit a predetermined message to a destination registered in advance via the communication unit 76.

In addition, in this example, the control unit 71 can cause the camera 722 to image the interior and store an image in the storage unit 75 or transmit the image to a destination registered in advance via the communication unit 76.

After a person is detected by the human sensor 702 during the monitoring mode, it may be immediately determined that there is an abnormality and a notification may be performed, or when there is no release of the monitoring mode in a certain period of time, it can be determined that there is an abnormality and a notification can be performed.

Control Operation Regarding Infrared LED

The following operation can be performed as a control operation using the infrared LED 703.

Specifically, when a wakeup time set using a timer program in advance comes, the control unit 71 controls an operation of the corresponding device on the basis of action information associated with the time information.

For example, when a timer program in which "lighting ON" at a wakeup time (7:00) and "lighting OFF" at a bedtime (23:00) are set has been registered, the control unit 71 fetches remote control information of "lighting ON" from the storage unit 75 and causes corresponding infrared information to be transmitted from the infrared LED 703 when at 7:00, and fetches remote control information of "lighting OFF" from the storage unit 75 and causes corresponding infrared information to be transmitted from the infrared LED 703 when at 23:00.

Thus, it is possible to automatically operate a predetermined device at a predetermined date and time.

In addition, ON/OFF control of an air conditioner or the like can be performed according to the temperature and humidity detected by the temperature and humidity sensor 711, or ON/OFF control of a television can be performed according to a time zone. Control operation regarding optical sensor Using the optical sensor 721, it is possible to detect that a curtain is not opened, for example, despite being in the daytime, and prompt the user to open the curtain.

Specifically, when a sunrise time is stored as calendar information in the storage unit 75 and an illuminance input from the optical sensor 721 is less than a predetermined illuminance even if the sunrise time is passed, the control unit 71 causes sound data ("Let's open the curtain") stored in the storage unit 75 in advance to be output from the speaker 705.

Control Operation Regarding Noise Sensor

Using the noise sensor 713, for example, it is possible to warn a user that a television has been turned on for a long time.

Specifically, when the control unit 71 determines that the television has been turned on on the basis of a volume, frequency or the like of a voice input by the noise sensor 713, the control unit 71 starts counting from a time when the determination is made. When the time of that state has exceeded a predetermined time, the control unit 71 fetches audio data ("Let's turn off the TV") stored in the storage unit 75 in advance and causes the audio data to be output from the speaker 705.

Accordingly, it is possible to contributes to energy saving and to give a user a feeling as if the user is warned by a wife.

Control Operation Regarding Vibration Sensor

An earthquake can be detected and an informing operation can be performed using the vibration sensor 712.

For example, when a vibration having a predetermined magnitude is detected by the vibration sensor 712 in a state in which the presence of a person is not detected by the human sensor 702, it is determined that an earthquake has occurred, and the control unit 71 can cause a predetermined warning sound or message to be output from the speaker 705 or can transmit a predetermined message to a destination registered in advance via the communication unit 76.

On the other hand, when a vibration having a predetermined magnitude is detected by the vibration sensor 712 in a state in which the presence of a person is detected by the human sensor 702, it is determined that the vibration is due to an artificial action of a user or the like, informing is not performed. It should be noted that in this case, for example, a voice message ("Do not shake!") can be output from the speaker 705.

Thus, it is possible to perform operations corresponding to an earthquake and daily vibrations, while accurately distinguishing the earthquake and daily vibrations. Control operation on temperature and humidity sensor Predetermined sound output control corresponding to the temperature and humidity sensor 711 can be performed.

For example, when a temperature detected by the temperature and humidity sensor 711 is less than 10° C., the control unit 71 can cause a voice such as "it is cold today" to be output from the speaker 705 at a predetermined timing.

When a humidity detected by the temperature and humidity sensor 711 is less than 40%, the control unit 71 can cause a voice such as "It is dry! Do not catch a cold" to be output from the speaker 705 at a predetermined timing.

In addition, various input and output controls are possible.

For example, on the basis of input information of temperature and humidity or weather information, a voice such as "You'd better bring an umbrella" can be output or recommendable clothes corresponding to a temperature and humidity, weather information, calendar information, or the like can be displayed in response to a voice input such as "What should I wear" from a user.

As described above, with the three-dimensional image display device 1 according to the first example, it is possible to display the character or the like that is a display target more three-dimensionally like a real body that is in the same space.

Further, the three-dimensional image display device 1 realizes a unit in which these devices or components are compactly integrated, by providing the reflection mirror 5 and optimizing a position or angle of the projector 4 or the reflection mirror 5.

Further, in a so-called transmission type screen of the related art, a projector installed behind the screen may enter a field of vision of the user through the screen, but the projector is prevented from entering the field of view using a reflection mirror 5.

In addition, in the three-dimensional image display device 1 of the example, a behavior corresponding to a voice of the user or various types of environmental information is caused to be performed by character or the like.

Accordingly, it is possible to give the user a feeling as if the user is in the same space as the character or the like that actually exists.

For example, it is possible to call a favorite character or the like, and enable various output operations in which a user thinks that the user is living in the same space, including dialogue with the called character or the like.

Further, such a point is greatly different from a home robot of the related art configured of hardware of which an appearance has been fixed.

That is, a robot of the related art gets easily bored because a form of the robot does not change. When the robot is shared by a plurality of users, some users may not feel the robot familiar and may feel that communication is difficult.

On the other hand, according to the three-dimensional image display device 1 of the example, the three-dimensional image display device can be provided as a more familiar digital communication robot coping with all users.

Second Example

Next, a three-dimensional image display device 1 according to a second example will be described with reference to FIGS. 7 to 9.

The three-dimensional image display device 1 of the example is the same as that of the first example in a configuration in which a transmission film 3 is provided in a transparent cylindrical case 2, and an image of a character or the like output from a projector 4 is projected onto the transmission film 3 via a reflection mirror 5.

In the second and first examples, a shape of the entire device and shapes of respective portions (for example, the upper accommodation portion 21, the lower accommodation portion 22, the pillar portion 6, or the like) are somewhat different, but a basic configuration such as an image projection method is the same.

The entire case 2 (including the substantially entire case 2) is a housing made of a light transmission member. As illustrated in FIG. 8, two transparent semi-cylindrical case members 2a and 2b are incorporated into the two posts 23, thereby forming an integral transparent cylindrical body as a whole.

The transmission film 3 is provided to be substantially vertical near a center of the inside of the case 2.

Specifically, the transmission film 3 is supported by the two posts 23 erected on both end portions of the pedestal 221. Accordingly, the transmission film 3 is vertically erected at the center of the pedestal 221.

The lower accommodation portion 22 is a cylindrical body formed of plastic or the like and having a relatively small height, and includes a space in which a device such as the control board 701 is attached (see FIG. 5C).

A surface of the lower accommodation portion 22 is coated with an opaque paint or the lower accommodation portion 22 is formed of an opaque material such that the inside of the lower accommodation portion 22 cannot be visually recognized.

The lower accommodation portion 22 can be separated into a box portion and a lid portion (not illustrated) and, for example, the above device can be attached in the box portion.

Opening portions 24 are provided at right and left end portions of an erecting position of the transmission film 3 on an upper surface (pedestal 221) of the lower accommodation portion 22. The lower end portion of the post 23 is fitted to the opening portion 24 so that the post 23 is erected on the pedestal 221.

Three sets of grooves into which the transmission film 3 or the case members 2a and 2b can be inserted are formed in the posts 23 in a T shape in a cross section view, and the transmission film 3 and the two case members 2a and 2b are inserted into the respective grooves of the posts 23, thereby being supported in a state in which the transmission film 3 and the two case members 2a and 2b are erected on the pedestal 221.

The entire pedestal 221 is colored or patterned so that the presence of the pedestal 221 can be easily visually recognized. For example, the pedestal 221 of the example is colored on the basis of black, and white spots are given along pattern portion of a so-called magic square.

Therefore, when an image of a character or the like erecting on the transmission film 3 is projected, it is possible to cause the character or the like to look as if the character or the like actually erects on the pedestal 221 when the image is projected so that a foot of the character or the like matches the lower end of the transmission film 3 (see FIG. 7).

In addition, in the pedestal 221 of the example, a plurality of effect LEDs 706 are embedded at regular intervals along an outer circumference of the magic square so that light is radiated from a region on each surface straddling the transmission film 3.

Thus, it is possible to further emphasize that the pedestal 221 exists before and after the character or the like by causing each effect LED 706 to emit light.

Thus, it is possible to cause the character or the like to look as if the character or the like firmly stands on the pedestal 221.

The upper accommodation portion 21 of the example has substantially the same shape as the lower accommodation portion 22, and includes a space in which a device such as the projector 4 is attached (see FIG. 5A).

Figure 8:
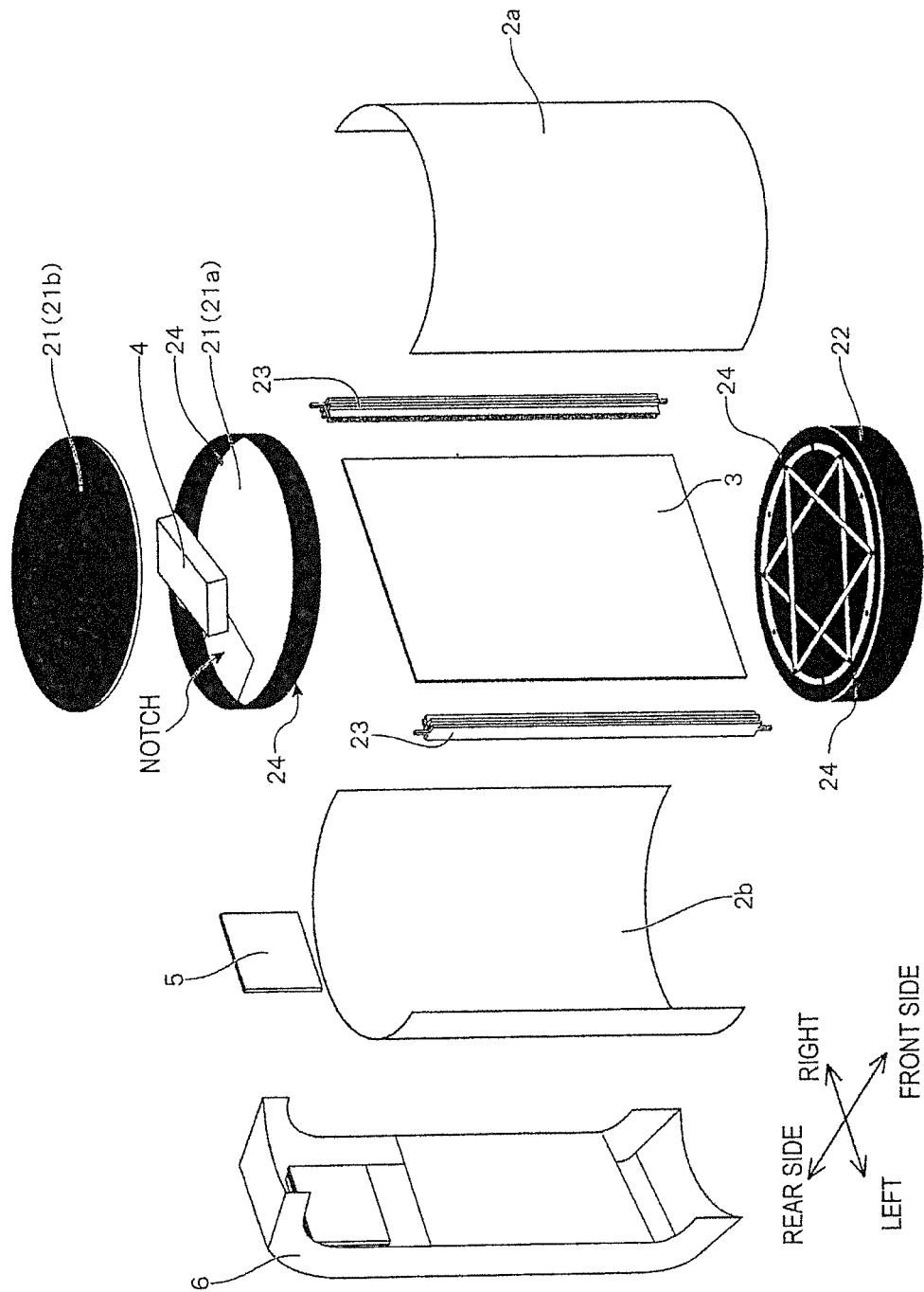
FIG. 8 is an exploded perspective view of the three-dimensional image display device according to the second example.

The upper accommodation portion 21 can be separated into a box portion 21a and a lid portion 21b, and the above device is attached in the box portion 21a, as illustrated in FIG. 8.

Opening portions 24 corresponding to the positions of the posts 23 erected on the lower accommodation portion 22 (the pedestal 221) are provided in the box portion 21a, and upper end portions of the posts 23 are fitted in the opening portions 24.

Accordingly, the posts 23 are fixed in a state in which the posts 23 are erecting between the lower accommodation portion 22 and the upper accommodation portion 21, and the two semi-cylindrical case members 2a and 2b and the rectangular transmission film 3 are fixed in a state in which the case members 2a and 2b and the transmission film 3 are erected by the two fixed posts 23.

As a result, the cylindrical case 2 is erected on the pedestal 221, and the rectangular transmission film 3 is erected at a center inside the case 2 (see FIG. 7).

A surface of the upper accommodation portion 21 is coated with an opaque paint or the upper accommodation portion 21 is formed of an opaque material such that the inside of the upper accommodation portion 21 cannot be visually recognized.

For example, a black material is used for the upper accommodation portion 21, or the upper accommodation portion 21 is coated with a black paint, thereby making it difficult for light to pass through the upper accommodation portion 21.

Thus, it is possible to prevent an indoor lighting or the like from entering the transmission film 3 located under the upper accommodation portion 21, and to make it easy to see the image displayed on the transmission film 3.

The projector 4 is provided in the box portion 21a. The projector 4 is disposed to be aligned with the position of the reflection mirror 5 and inclined so that an output direction is directed in an obliquely downward direction on the rear side.

In the box portion 21a, a notch is provided in a bottom portion on the rear side. Accordingly, image light output in an obliquely downward direction on the rear side from the projector 4 provided in the upper accommodation portion 21 can reach the reflection mirror 5 without being blocked by the bottom portion of the box portion 21a.

The projector 4 is an image output unit that outputs an image of a character or the like. This type of projector 4 normally displays an image by directly projecting an image on a so-called screen, whereas in the example, an image is indirectly projected onto a screen (the transmission film 3) via the reflection mirror 5.

The pillar portion 6 is a pillar member attached to the rear surface side of the case 2, and the reflection mirror 5 or various sensors are attached (see, for example, FIGS. 7 and 5(ii)).

Inside the pillar portion 6, signal lines connected to various sensors, signal lines connected to the devices provided in the lower accommodation portion 22 or the upper accommodation portion 21 or the like can be provided so that the signal lines are not seen from the outside.

The reflection mirror 5 is provided in the upper portion of the pillar portion 6, and reflects the image light output from the projector 4.

The reflection mirror 5 has a rectangular shape and attached so that a mirror surface is substantially vertical (substantially parallel to the transmission film 3).

Figure 9:
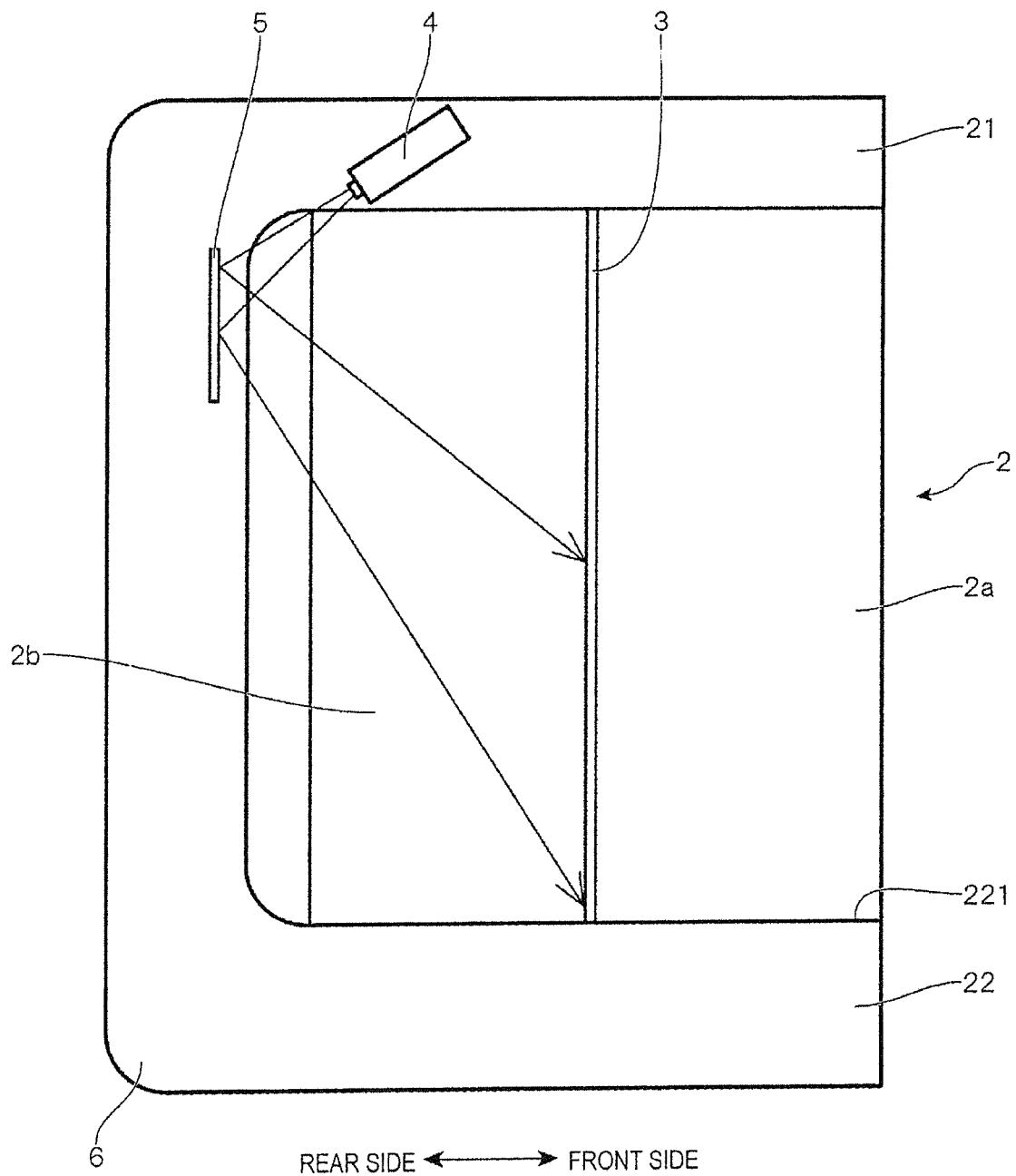
FIG. 9 is an optical path diagram of a projected image in the three-dimensional image display device according to the second example.

Accordingly, the image light output from the projector 4 travels in an obliquely downward direction on the rear side and reaches the reflection mirror 5, as illustrated in FIG. 9. The image light reflected by the reflection mirror 5 travels in an obliquely downward direction on the front side and is projected onto the transmission film 3 from the rear side.

Thus, with the three-dimensional image display device 1 according to the second example, the shape or the like is different from that of the first example, but a basic configuration is the same as that of the first example.

Therefore, an effect that the character or the like projected onto the transmission film 3 is visually recognized more three-dimensionally like a real object in the same space when the transmission film 3 is viewed through the transparent case 2 is achieved as in the first example.

Third Example

Figure 10:
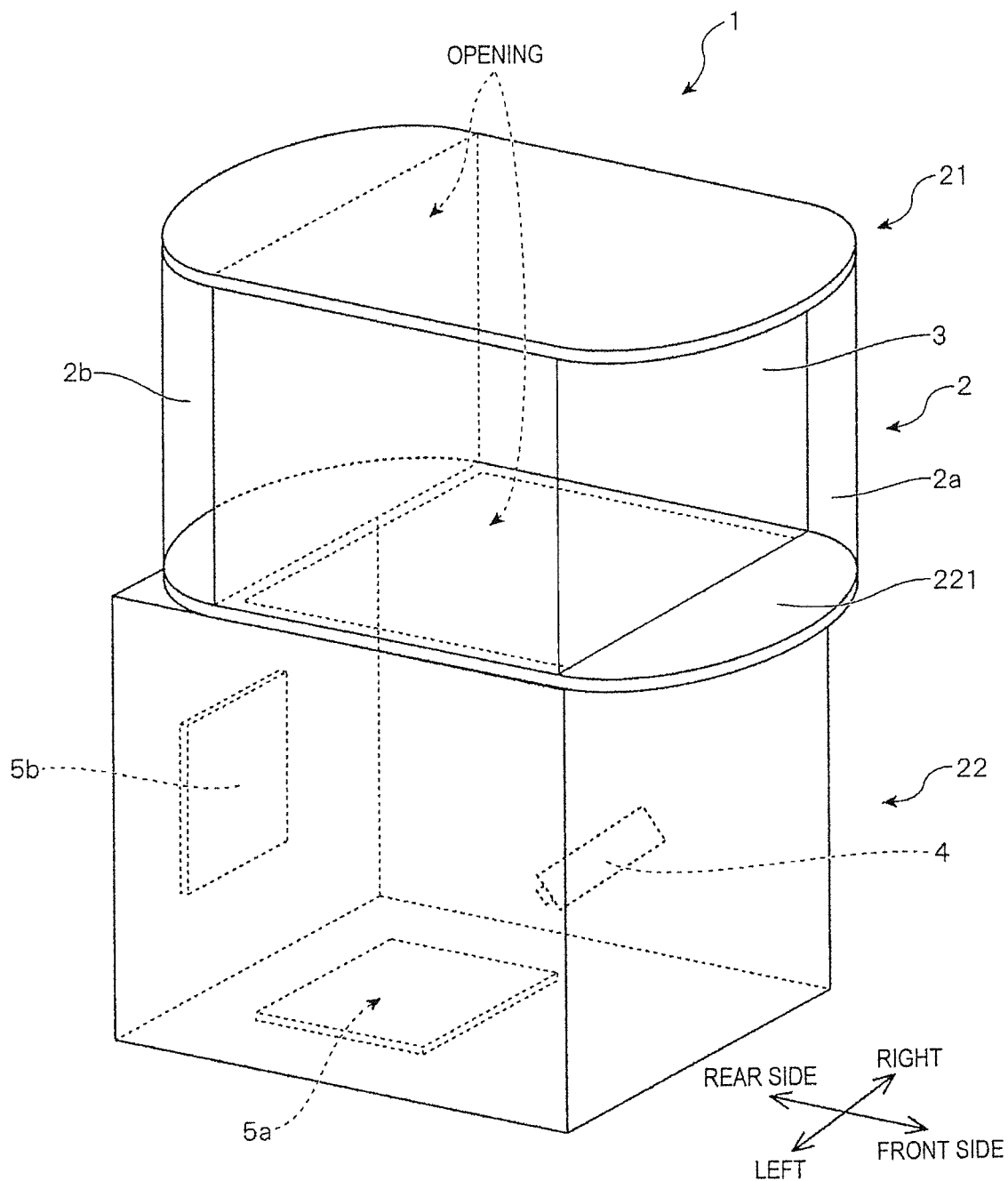
FIG. 10 is a perspective view of a three-dimensional image display device according to a third example when viewed from above.
Figure 11:
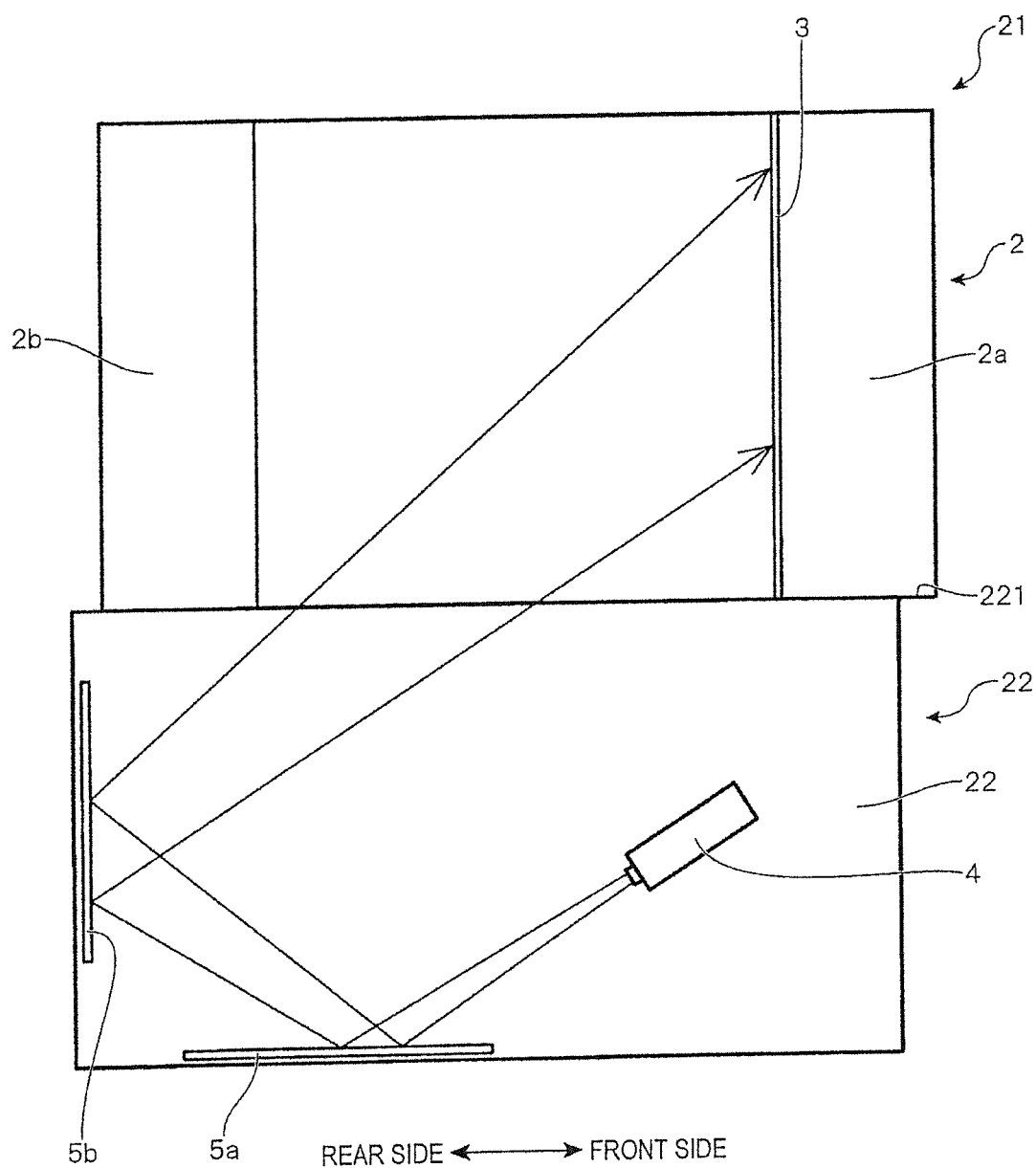
FIG. 11 is an optical path diagram of a projected image in the three-dimensional image display device according to the third example.

Next, a three-dimensional image display device 1 according to a third example will be described with reference to FIGS. 10 and 11.

In the three-dimensional image display device 1 of the third example, a projector 4 and a reflection mirror 5 are disposed on the lower side and an image is projected onto a transmission film 3 from the lower side of the rear side, whereas in the three-dimensional image display device 1 of the example described above, the projector 4 and the reflection mirror 5 are arranged on the upper side and an image is projected from the upper side of the rear side of the transmission film 3. In such a projection method, the above-described example is different from the third example.

The three-dimensional image display device 1 of the example mainly includes an upper accommodation portion 21 and a lower accommodation portion 22 that correspond to a case 2.

In the upper accommodation portion 21, semi-cylindrical case members 2a and 2b are provided on the front side and the rear side, and a semicircular pedestal 221 is provided at the lower end of the semi-cylindrical case members 2a and 2b.

In a central portion of the upper accommodation portion 21 corresponding to the rear side of the pedestal 221, left and right side portions are shielded by walls, and a bottom portion and a side portion on the rear side are open. Among these, an opening portion at the bottom portion communicates with the inside of the lower accommodation portion 22, and an opening portion at the side portion on the rear side communicates with the transparent case member 2b on the rear side.

Therefore, in the example, a part of the case 2 is formed of a light transmission member. In this respect, the third example differs from the above-described example in which the entire case is formed of a light transmission member.

Inside the lower accommodation portion 22, reflection mirrors 5a and 5b are respectively provided in a bottom portion and a side portion on the rear side, and the projector 4 provided on the front side is installed toward a projection direction to the reflection mirror 5a located in an obliquely downward direction.

According to the three-dimensional image display device 1 having such a configuration, an image light output from the projector 4 is reflected by the reflection mirror 5a and then reflected by the reflection mirror 5b. This reflected light is passed through the opening portion between the lower accommodation portion 22 and the upper accommodation portion 21 in an obliquely upward direction and is projected onto the transmission film 3 from the rear side, as illustrated in FIG. 11.

Therefore, when the three-dimensional image display device 1 is viewed from the front, the image projected onto the transmission film 3 provided inside the transparent case 2 is displayed. Accordingly, an effect that an image of the character or the like is three-dimensionally visually recognized is achieved, as in the example described above.

Further, a plurality of reflection mirrors 5 are provided in a large space in the lower accommodation portion 22, and a projection angle with respect to the transmission film 3 is in-creased with an increase in a projection distance from the projector 4 to the transmission film 3.

Therefore, it is possible to configure the three-dimensional image display device 1 using a projector having a specification in which an allowable projection distance is comparatively long and an allowable projection angle is relatively large, as compared to the above-described example.

Further, by providing the projector 4 and the reflection mirror 5 on the lower side of the transmission film 3, an effect that the projector 4 and the reflection mirror 5 do not enter a field of view is achieved.

Other Examples

Next, a three-dimensional image display device according to another example different from the first to third examples described above will be described.

FIGS. 12A to 12D are optical path diagrams of a projected image in the three-dimensional image display device according to the example.

As illustrated in FIGS. 12A to 12D, each three-dimensional image display device 1 includes a pedestal 221 in a lower portion of a cylindrical transparent case 2. A transmission film 3 is erected at a center of the pedestal 221, and an upper accommodation portion 21 accommodating a projector 4 is included on an upper portion.

Figure 12A:
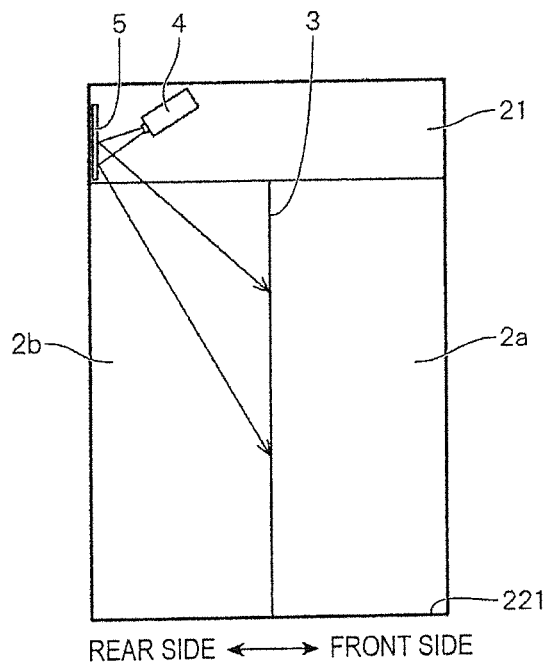
FIGS. 12A to 12D are optical path diagrams of a projected image in a three-dimensional image display device according to another example.
Figure 12B:
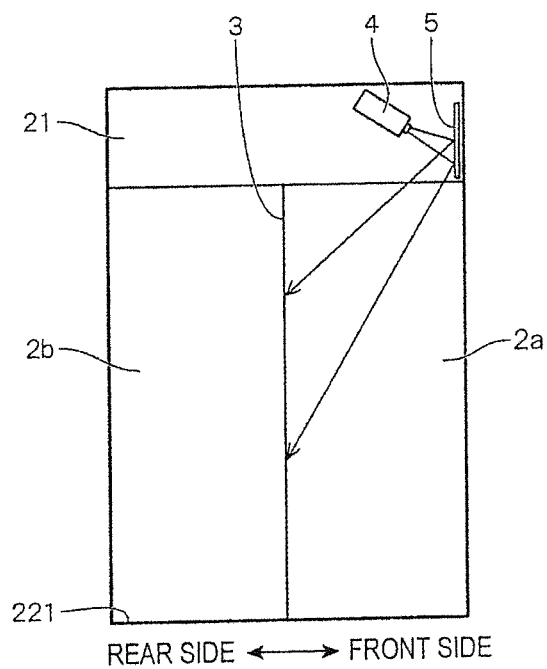

In the three-dimensional image display device 1 illustrated in FIG. 12A, a reflection mirror 5 is disposed on the rear side inside the upper accommodation portion 21, and in the three-dimensional image display device 1 illustrated in FIG. 12B, a reflection mirror 5 is disposed on the front side inside the upper accommodation portion 21.

In the first or second examples, the reflection mirror 5 is provided in the outside separated from the case, whereas in the other example, the reflection mirror 5 is housed in the upper accommodation portion 21 formed integrally with the case 2.

By doing so, the entire device can be made more compact.

In this example, a projection distance from the projector 4 to the transmission film 3 is relatively short, and a projection angle with respect to the transmission film 3 becomes an acute angle.

Therefore, there is a condition in which the projector 4 having a specification in which the allowable projection distance is shorter and the allowable projection angle is smaller than that of the projector 4 that can be mounted on the three-dimensional image display device 1 of the first example is used for the projector 4 mounted on the three-dimensional image display device 1 of the other example.

According to the three-dimensional image display device 1 having such a configuration, since the projector 4 and the reflection mirror 5 are installed inside the upper accommodation portion 21 which is not visually recognized from the outside, the projector 4 and the reflection mirror 5 do not enter a field of view.

Further, since the projector 4 and the reflection mirror 5 or installation mechanisms thereof are not visually recognized from the outside, these are excellent in design.

Further, when viewed from the front side or the rear side, a light source or the like of the projector 4 or the reflection mirror 5 do not enter the field of view, visibility is excellent.

Further, in the three-dimensional image display device 1 illustrated in any one of FIGS. 12A and 12B, part of the image light projected onto the transmission film 3 is transmitted through the transmission film 3 and is projected on the pedestal 221 as a shadow. Accordingly, an effect that a display target is three-dimensionally visually recognized is achieved.

Particularly, when an image is projected into the transmission film 3 from the upper front side, transmitted light is projected on the rear side. Thus, it is possible to obtain a three-dimensional effect due to a more natural shadow, as in the three-dimensional image display device 1 illustrated in FIG. 12B.

Figure 12C:
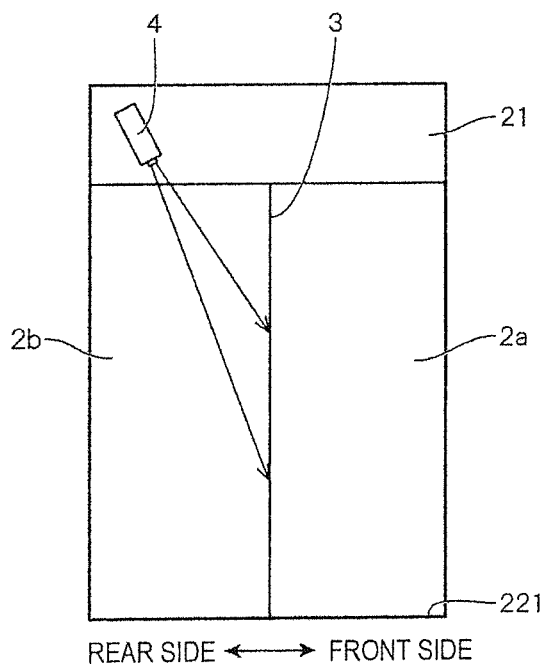
Figure 12D:
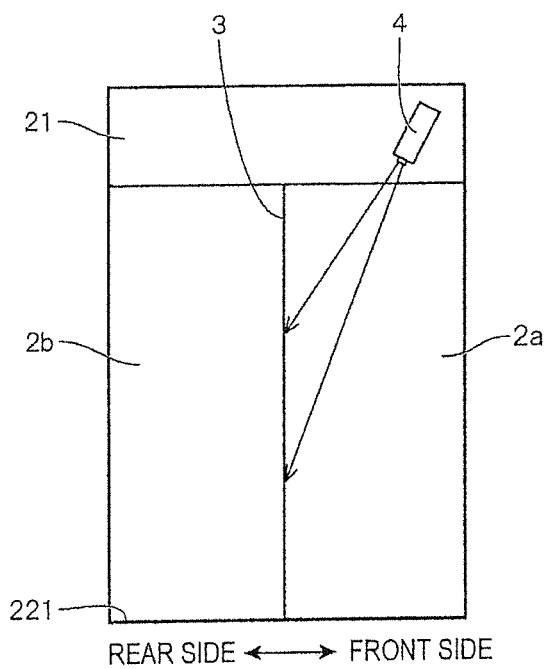

In the three-dimensional image display device 1 illustrated in FIG. 12C, the projector 4 is disposed on the rear side inside the upper accommodation portion 21, and in the three-dimensional image display device 1 illustrated in FIG. 12D, the projector 4 is disposed on the front side inside the upper accommodation portion 21.

As can be seen from a comparison with FIGS. 12A and 12B, these three-dimensional image display devices 1 have a simple configuration in which the reflection mirror 5 is not used.

According to the three-dimensional image display device 1 having such a configuration, since the reflection mirror 5 is not provided, an effect that a design or visibility is excellent, similar to FIGS. 12A and 12B, with a simpler configuration is achieved.

In this example, a projection distance from the projector 4 to the transmission film 3 is further shortened, and the projection angle with respect to the transmission film 3 becomes a more acute angle.

Therefore, there is a condition in which a projector having a specification in which the allowable projection distance is smaller and the allowable projection angle is smaller is used.

Although the preferred examples of the three-dimensional image display device 1 have been described above, our three-dimensional image display device 1 is not limited to the examples described above and it is apparent that various modifications can be performed in the scope of this disclosure.

In the example, not only the entire device but also a shape, position, size, mechanism, design or the like of each portion (the upper accommodation portion 21, the lower accommodation portion 22, the pillar portion 6, the posts 23 or the like) constituting the device can be made in an aspect different from that in the example.

For example, the upper accommodation portion 21 and the lower accommodation portion 22 are not limited to the shapes of the above-described examples, and any shape may be adopted. Further, an aspect in which the upper accommodation portion 21 and the lower accommodation portion 22 are partially open like the upper accommodation portion 21 of the first example may be adopted. An aspect in which the upper accommodation portion 21 and the lower accommodation portion 22 are sealed like the upper accommodation portion 22 of the second example may be adopted. Further, the inside may be visible, or an aspect in which the inside is invisible may be adopted.

Further, a configuration in which a combination of the projector 4 and the reflection mirror 5 or only the projector 4 is provided inside the upper accommodation portion 21 has been adopted in FIGS. 12A to 12D. On the other hand, a configuration in which the lower accommodation portion 22 is provided and the combination of the projector 4 and the reflection mirror 5 or only the projector 4 is provided in the lower accommodation portion 22 can be adopted.

Further, an attachment mechanism or an attachment position of a device including the projector 4 is not limited to that in the example described above. For example, the projector 4 may be attached to a member having a ladder shape as in the first example, and the device may be installed in a housing, and the device may be attached in various ways as in the second and third examples.

Further, the other accommodation portion can be omitted by aggregating the devices in any one of the upper accommodation portion 21 and the lower accommodation portion 22.

An aspect in which the pillar portion 6 approaches or comes into contact with the case 2 may be adopted or an aspect in which the pillar portion 6 is separated from the case 2 may be adopted. Further, when devices such as the reflection mirror 5 and sensors are provided in other component such as the upper accommodation portion 21 or the lower accommodation portion 22, the pillar portion 6 can be omitted.

Further, the shape of the case 2 is not limited to the cylindrical shape, and may be any shape such as a prismatic shape, a spherical shape, or an egg shape.

For example, in the prismatic shape, the image displayed on the transmission film 3 can be visually recognized through the transparent case 2. Thus, it is possible to obtain a three-dimensional visibility effect as in the cylindrical shape.

Further, the transmission film 3 is not limited to a rectangular shape, and may have any shape. For example, the transmission film 3 may have a shape in internal contact with the case 2 according to the shape of the case 2.

Further, the shape of the pedestal 221 is not limited to a circle, and any shape may be used. For example, the pedestal 221 can have a cross-sectional shape according to the shape of the case 2. Further, the pattern of the pedestal 221 is not limited to the magic square, and the pedestal 221 may have any pattern. In addition, a light emitting unit other than the LED may be used as the light emitting unit provided on the pedestal 221, or an aspect in which the entire pedestal 221 is irradiated by the light emitting unit from above the pedestal 221 may be adopted.

In addition, although a large number of effect LEDs 706 are provided on the pedestal 221 (see FIG. 1, FIG. 7 or the like), the effect LEDs 706 can be combined into one.

That is, a plurality of effect LEDs 706 are not necessarily required to emphasize the visibility of the pedestal 221.

Further, one effect LED 706 may be provided for at least each of a region on the front side and a region on the rear side straddling the transmission film 3.

That is, a large number of effect LEDs 706 are not necessarily required as long as it is possible to cause each region straddling the transmission film 3 to be strongly recognized on the surface of the pedestal 221 and further emphasize the presence of the pedestals 221 before and after the character or the like projected onto the transmission film 3.

Further, the position of the projector 4 or the reflection mirror 5 is not limited to the position in the above-described example. For example, any position such as a middle of the device body or a position shifted to the right or left may be used as long as the projection onto the transmission film 3 is possible.

An installation angle of the projector 4 or the reflection mirror 5 is not limited to the angle in the example described above. Although the reflection mirror 5 is made substantially vertical in the example described above, the reflection mirror 5 may be tilted by several degrees or more from a vertical state, for example. The projector 4 can also be tilted at an installation angle corresponding thereto.

Further, a shape of the reflection mirror 5 may also be, for example, circular without being limited to a specification (a focal length, a projection ratio, or the like) of the projector 4. Further, the three-dimensional image display device 1 does not necessarily have to satisfy the specification of the projector 4. For example, when a size of the body device, an installation position of the projector 4 and the reflection mirror 5 or the like is not suitable for a predetermined focal distance or projection ratio, quality such as image quality is degraded, but this can be applied without limitation when the configuration is included.

Further, a configuration in which a liquid crystal panel is provided inside the transparent case 2 and a digital image is output to the liquid crystal panel can be adopted. In this example, it is possible to achieve the same effects as those of the three-dimensional image display device 1 of each of the examples described above by causing a landscape on the rear side to look through a display region other than a display target that is the character or the like.

Figure 13:
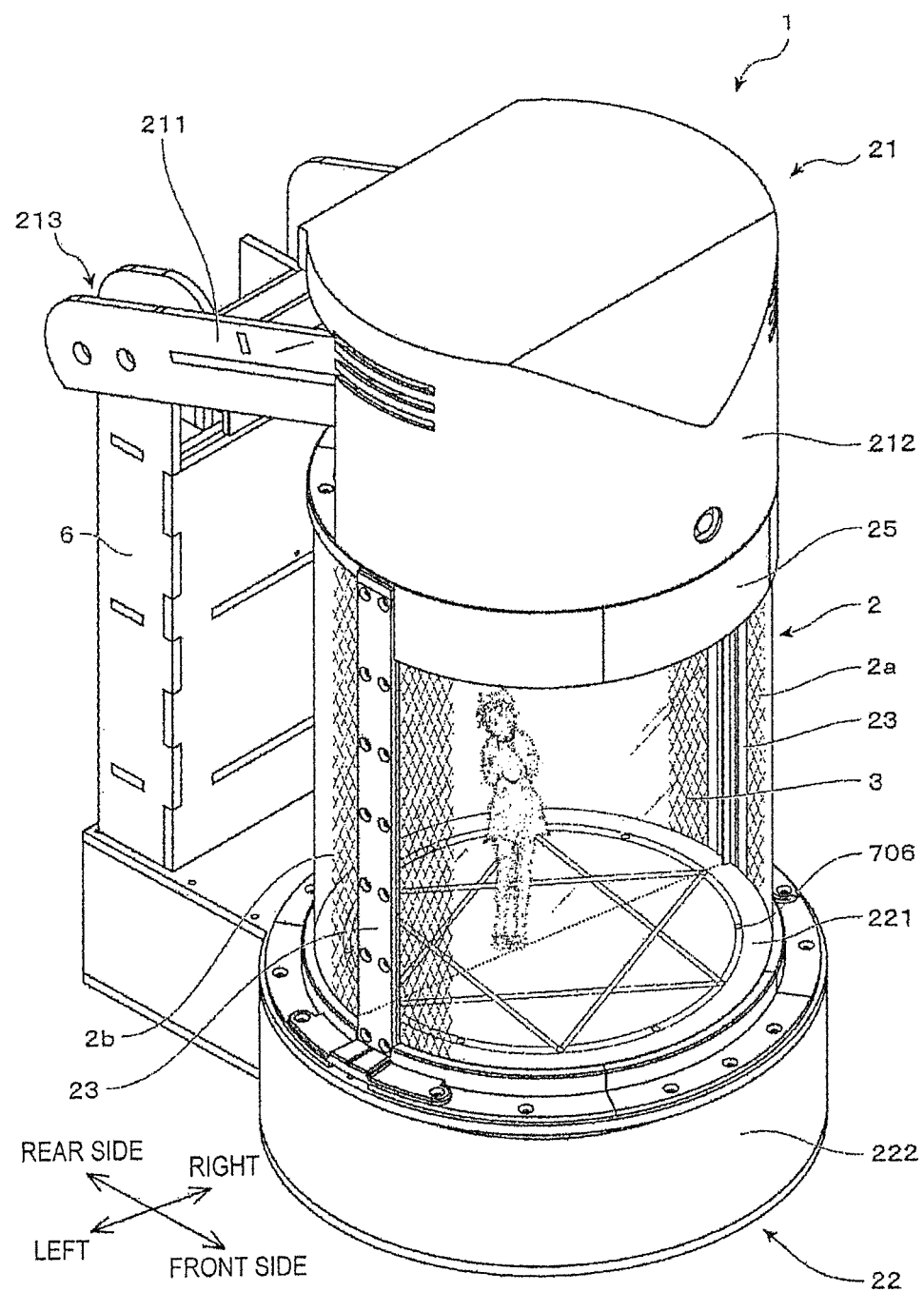
FIG. 13 is a perspective view of the three-dimensional image display device according to the other example when viewed from above.
Figure 14:
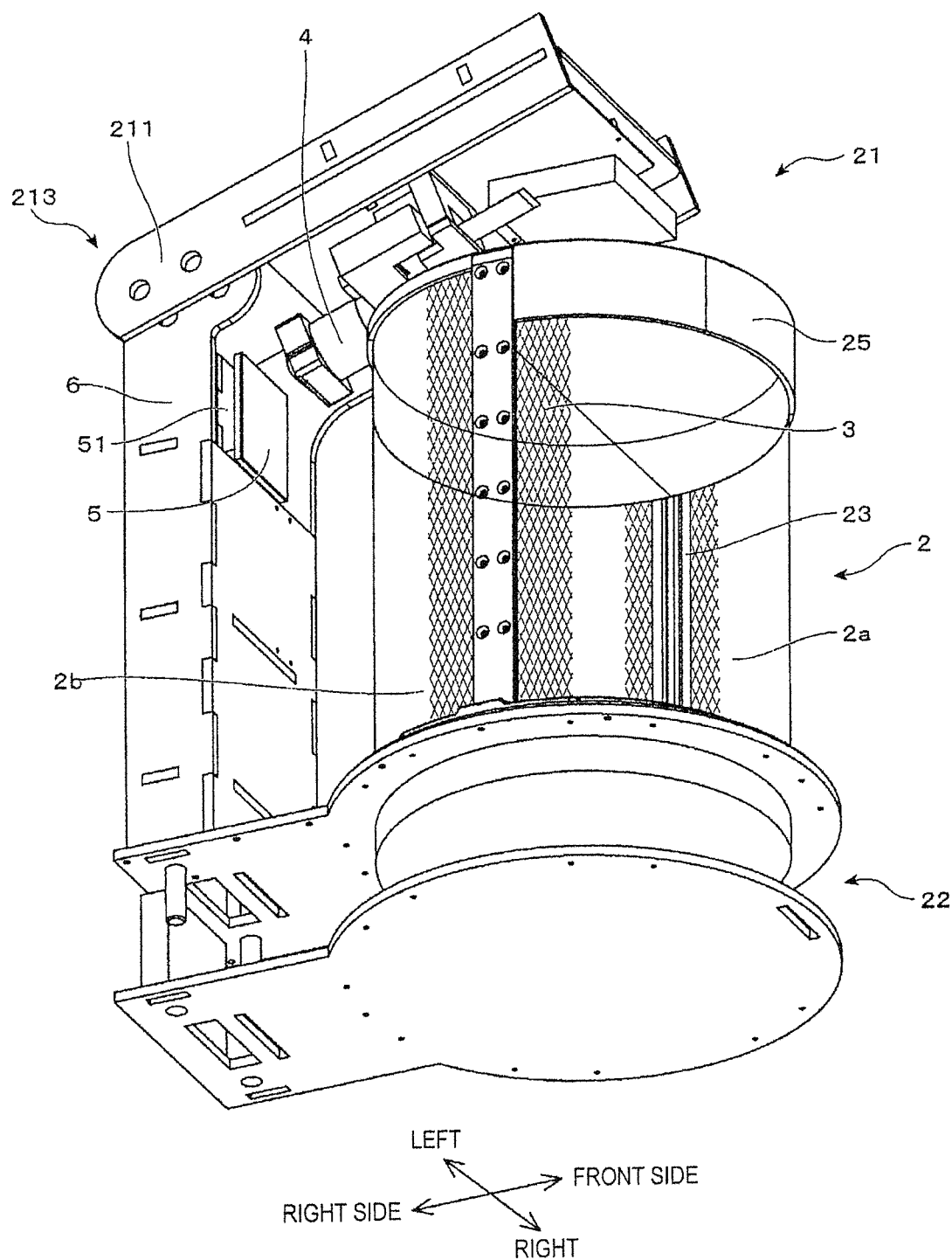
FIG. 14 is a perspective view of the three-dimensional image display device according to the other example as viewed from below.
Figure 15:
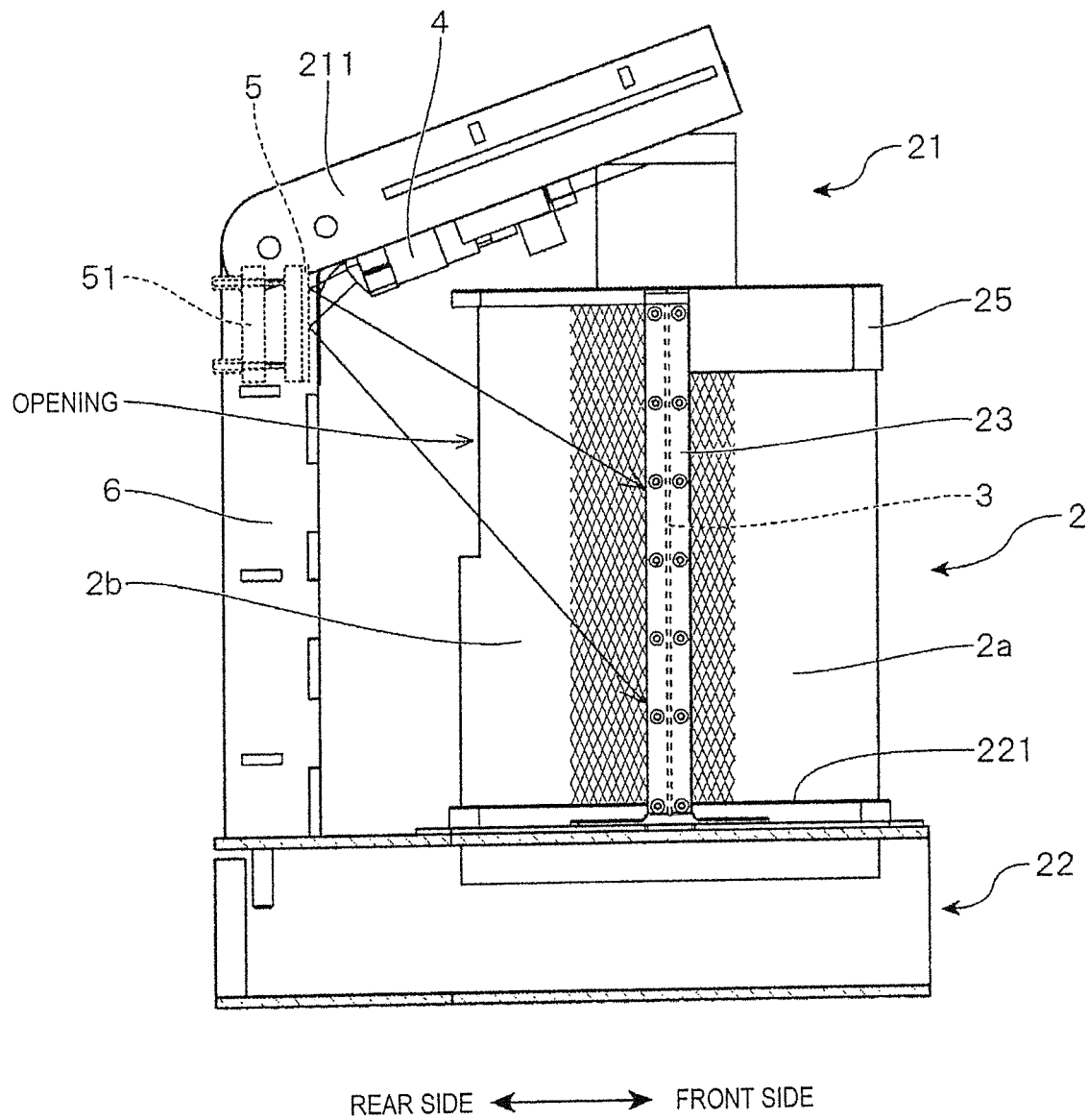
FIG. 15 is a left side view of the three-dimensional image display device according to the other example.

Further, in the three-dimensional image display device 1 according to the above-described example, the case members 2a and 2b covering the periphery of the transmission film 3 (a flat member) are configured so that the entire surface thereof can transmit, but this disclosure is not limited thereto. The case members 2a and 2b may not be configured so that the entire surface thereof can transmit. In the three-dimensional image display device 1, the visibility from the side surface is inevitably lower than the visibility from the front side due to the configuration in which the image is projected onto the transmission film 3 (the flat member). Specifically, when the character is visually recognized from the side, the character is likely to look as if the character is distorted as compared when the character is visually recognized from the front side. Further, when the projected character is viewed from the side, the projected character is likely to be visually recognized by the user in an unintended form. Therefore, in the three-dimensional image display device 1, the case members 2a and 2b at places corresponding to the side surface of the transmission film 3 (the flat member) may be processed to be opaque (see shaded places in FIGS. 13 to 15), as illustrated in FIGS. 13 to 15. By doing this, it is possible to cause the user to visually recognize the character from the front side by preventing the user from visually recognizing from the side surface. That is, in the three-dimensional image display device 1, it is possible to perform such a process so that the user desires to visually recognize the character from the front side as much as possible. In FIGS. 13 to 15, places corresponding to the side surface sides of the flat plates of the case members 2a and 2b are processed not to be transparent uniformly from the bottom surface to the top surface, but this disclosure is not limited thereto. For example, the case members 2a and 2b may be processed not to be transparent from the bottom surface to a predetermined distance (a distance shorter than a distance up to a top surface) and remain to be transparent from the distance to the upper portion, instead of the entire range indicated by shading in FIGS. 13 to 15 being processed not to be transparent. Alternatively, reverse processing (processing the top surface side to be opaque and the bottom side to be transparent) may be performed on the case members 2a and 2b. Further, a region (width) to be made opaque may be configured to be different between the case member 2a and the case member 2b. In that example, it is preferable for an opaque region of the case member 2b on the rear side to be configured to be wider than an opaque region of the case member 2a. Further, the opaque region in the case member 2a is a region in which the visibility from the front side is not degraded.

Figure 16:
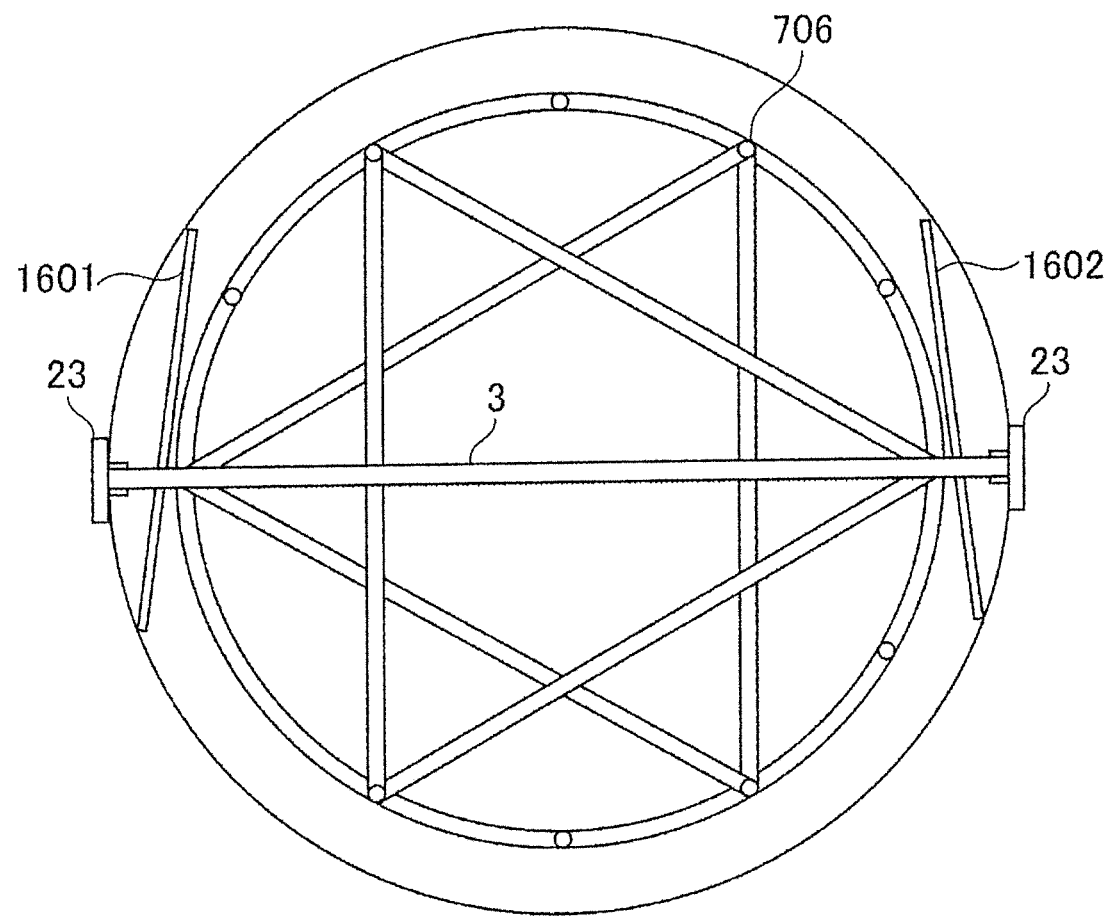
FIG. 16 is a plan view of the three-dimensional image display device according to the other example.

A part of the case members 2a and 2b is processed to be opaque, but a scheme of incorporating a configuration in which light transmission characteristics of the side surface of the three-dimensional image display device 1 is reduced so that a user desires to visually recognize an image from the front side, into the three-dimensional image display device 1 is not limited thereto. In addition, the same effects may be obtained by adhering a colored film along the case members 2a and 2b, in addition to performing the non-transparent processing on the case members 2a and 2b as a scheme of degrading the visibility on the side surface side. Alternatively, since it is only necessary for the visibility to be degraded as compared to the completely transparent state, for example, the case members 2a and 2b at positions indicated by shading in FIGS. 13 to 15 are colored with color transmitting light to some extent. Alternatively, as illustrated in FIG. 16, a configuration in which the visibility on the side surface side is degraded by providing partitions 1601 and 1602 inside the case may be adopted. FIG. 16 is a plan view of the three-dimensional image display device 1 as viewed from above. The partitions 1601 and 1602 may be erected to be perpendicular to the transmission film 3 or may be erected at an angle. In FIG. 16, an example in which the partitions 1601 and 1602 are erected at an angle is illustrated. The partitions 1601 and 1602 may be erected by being adhered to the bottom surface and the top surface of the three-dimensional image display device 1 or may be erected with grooves used to insert the partitions 1601 and 1602 into at least one of the bottom surface and the top surface. Further, the partition 1601 may be formed as a single plate with a slit used for inserting the transmission film 3 therebetween, or may be formed of two plates. The same applies to the partition 1602. Although the visibility of the side surface of the transmission film 3 (the flat member) is degraded here, the view of field on the front side may be kept satisfactory, and the visibility on the rear side may be also degraded. However, in this example, when the visibility is to be degraded by forming a partition screen on the rear side, it is necessary to prevent an optical axis of the projection onto the transmission film 3 from being obstructed. Further, mirror surface processing may be performed on the partitions 1601 and 1602 with respect to the front side.

What is claimed is:

1. A display device for displaying an image, the display device comprising:
    a case including an installation portion, the case partially or entirely having light transmission characteristics;
    a light transmission member having light transmission characteristics provided inside the case and installed on the installation portion;
    a display that displays the image on the light transmission member; and
    a light source that emits light installed in the case and installation portion,
    wherein the light emitted from the light source transmits through the case,
    the light transmission member includes a first surface on which the image is displayed and a second surface opposite the first surface,
    the light source is installed in the installation portion on at least one of the first surface side and the second surface side of the light transmission member, and
    the light source includes a first light source installed in the installation portion on the first surface side of the light transmission member and a second light source installed in the installation portion on the second surface side of the light transmission member.

2. The display device according to claim 1, wherein the first light source and the second light source are arranged at symmetrical positions with respect to the light transmission member.

3. The display device according to claim 1, wherein
    the image includes an image related to a character or an image related to a person, and
    the display device further includes a speaker that outputs a sound related to the character or the person.

4. The display device according to claim 1, wherein the display is provided inside the case and is a projector that projects the image onto the light transmission member.

5. The display device according to claim 4, wherein the light source emits the light in a direction from a position where the light source is installed in the installation portion to a position facing a surface of the installation portion on which the light transmission member is installed.

6. The display device according to claim 4, wherein
    the image includes an image related to a character or an image related to a person, and
    the light source emits the light from a foot of the image related to the character of a foot of the image related to the person.

7. The display device according to claim 4, wherein
    the image includes an image related to a character or an image related to a person, and
    the projector projects an image based on the image related to the character or the image related to the person.

8. The display device according to claim 4, wherein the case includes the projector therein.

9. The display device according to claim 4, wherein the projector is installed on a side of the case facing a surface of the installation portion on which the light transmission member is installed.

10. The display device according to claim 4, further comprising:
    a reflector that reflects the light emitted from the projector and projects the image onto the light transmission member, and
    an adjuster that adjusts an angle of the reflection unit with respect to the light transmission member and adjusts a projection position of the image projected onto the light transmission member.

11. The display device according to claim 1, wherein the installation portion includes at least a pedestal.

12. The display device according to claim 4, wherein the light transmission member is a screen having light transmission characteristics, and
    the projector projects the image onto the screen.

* * * * *